(12) United States Patent
Howard et al.

(10) Patent No.: US 6,607,776 B1
(45) Date of Patent: Aug. 19, 2003

(54) PROTEIN ENHANCED GELATIN-LIKE DESSERT

(75) Inventors: Ryan D. Howard, Indianapolis, IN (US); Faye Mulvaney, Indianapolis, IN (US); Ganesan Narsimham, West Lafayette, IN (US)

(73) Assignee: Indiana Soybean Board, Inc., Indianapolis, IN (US)

( * ) Notice: Subject to any disclaimer, the term of this patent is extended or adjusted under 35 U.S.C. 154(b) by 0 days.

(21) Appl. No.: 09/546,958

(22) Filed: Apr. 11, 2000

(51) Int. Cl.⁷ .................................................. A23L 1/05
(52) U.S. Cl. .................... 426/575; 426/573; 426/576; 426/656; 426/657; 426/72; 426/73; 426/74
(58) Field of Search ................................ 426/573, 575, 426/576, 656, 657, 72, 73, 74

(56) References Cited

U.S. PATENT DOCUMENTS

| | | |
|---|---|---|
| 4,084 A | 6/1845 | Cooper |
| 3,367,783 A | 2/1968 | Billerbeck ............ 99/131 |
| 3,956,173 A | 5/1976 | Towle .................. 252/316 |
| 3,968,267 A | 7/1976 | Ogasa et al. .......... 426/570 |
| 4,096,327 A | 6/1978 | Guiseley ............... 536/122 |
| 4,140,807 A | 2/1979 | Braverman ............ 426/573 |
| 4,276,320 A | 6/1981 | Moirano ............... 426/573 |
| 4,307,124 A | 12/1981 | Moirano ............... 426/575 |
| 4,737,374 A * | 4/1988 | Huber et al. .......... 426/565 |
| 5,385,747 A | 1/1995 | Katz et al. ............. 426/73 |
| 5,674,548 A | 10/1997 | Nakamura et al. ..... 426/598 |
| 5,866,189 A | 2/1999 | Garwood et al. ...... 426/573 |
| 5,965,176 A | 10/1999 | Yamamoto ............ 426/46 |
| 6,458,395 B1 | 10/2002 | Emoto |

FOREIGN PATENT DOCUMENTS

| | | |
|---|---|---|
| EP | 0 887 023 A2 | 12/1998 |
| EP | 1 046 347 A1 | 7/1999 |
| WO | WO 01/01789 A1 | 1/2001 |

* cited by examiner

*Primary Examiner*—Chhaya D. Sayala
(74) *Attorney, Agent, or Firm*—Bose McKinney & Evans LLP

(57) ABSTRACT

Various compositions for producing translucent to opaque protein enhanced dessert gels are disclosed. In general, the dessert gels comprise a gelling system plus flavorings, colorings, and nutritional additives. Exemplary embodiments of the gelling system comprise water, sweetener, carrageenan, and various proteins such as soy protein isolate, soy protein concentrate, whey, and sodium caseinate.

35 Claims, 29 Drawing Sheets

|  | *NuSoy* |
|---|---|
| Panelist: _____ | Date: _____ |

Please try each of the following Cherry Flavored *NuSoy* and place a mark next to the point which best describes how you believe this product tastes.

Thank you for participating in this Purdue University Food Process Engineering Taste Test!

| Taste | 324 | 532 | Texture | 324 | 532 |
|---|---|---|---|---|---|
| Like extremely |  |  | Like extremely |  |  |
| Like very much |  |  | Like very much |  |  |
| Like moderately |  |  | Like moderately |  |  |
| Neither like nor dislike |  |  | Neither like nor dislike |  |  |
| Dislike slightly |  |  | Dislike slightly |  |  |
| Dislike very much |  |  | Dislike very much |  |  |
| Dislike extremely |  |  | Dislike extremely |  |  |

FAVORITE FLAVOR: _____

Comments:

Signature: _____

Thank you again for participating. Your data is essential to this product. Honesty is appreciated.

FIG. 1

PROTEIN ENHANCED GELATIN-LIKE DESSERT

FIELD OF THE INVENTION

The present invention relates generally to food products, and more particularly to, a gelatin-like dessert containing protein.

BACKGROUND OF THE INVENTION

Gelatin desserts have come a long way since their inception. The patent to produce gelatin was first granted to Peter Cooper, of Tom Thumb engine and Cooper Union fame, in 1845. Over 150 years later, gelatin snacks produced under the Jell-O brand name sell more than 400 million boxes annually. Touted as "America's favorite food", Jell-O brand gelatin desserts has gained extraordinary popularity and is regularly eaten in 72% of all American households. This results in sales of over $212 million.

Hospital food ideally should be highly nutritious and functional in nature, but currently most hospital food does not measure up to this ideal. For example, hospitalized patients on fluid-only diets are allowed to eat gelatin desserts. The water inside the gelatin desserts serves to rehydrate the body. However, besides helping to rehydrate the body and the presence of sugar, gelatin desserts provide little nutritional value to aid in the recovery of the patient. Each day, over ten thousand servings of gelatin desserts are taken to the bedsides of people with a variety of ailments, from cancer patients to children recovering from tonsillectomies. These people would greatly benefit from a gelatin-like dessert which also included essential vitamins, minerals, and phyto-chemicals to aid their recovering bodies. Since diet has been linked to heart disease and some types of cancer, it would make sense that providing the sick patients with nutritious, healthy food would be a great option.

Accordingly, there is a need for a food product that is similar to those gelatin desserts produced under the Jell-O brand, but provides more nutritional value and in particular is a good source of protein.

SUMMARY OF THE INVENTION

The present invention addresses the above-identified need, as well as others, with a gelatin-like dessert that is translucent to opaque in appearance and that features a protein component. In an exemplary embodiment of the present invention, there is provided a dessert comprising a gelling system plus optional flavorings, colorings, and nutritional additives. In particular, the gelling system of the exemplary embodiments comprises water, sweetener, a gelling agent, and a protein component.

It is an object of the present invention to provide an improved dessert gel and mix for making same.

It is also an object of the present invention to provide a new and useful dessert gel and mix for same.

It is another object of the present invention to provide a dessert gel that is vegetarian friendly.

It is yet another object of the present invention to provide a dessert gel having a substantial protein component.

It is yet another object of the present invention to provide a dessert gel having a carrageenan based gelling system with a relatively slow rate of water loss.

The above and other objects, features, and advantages of the present invention will become apparent from the following description and the attached drawings.

BRIEF DESCRIPTION OF THE DRAWINGS

FIG. 1 depicts an exemplary taste test survey utilized to help reformulate the dessert gels of the present invention;

DESCRIPTION OF EXEMPLARY EMBODIMENTS

Figure 2:
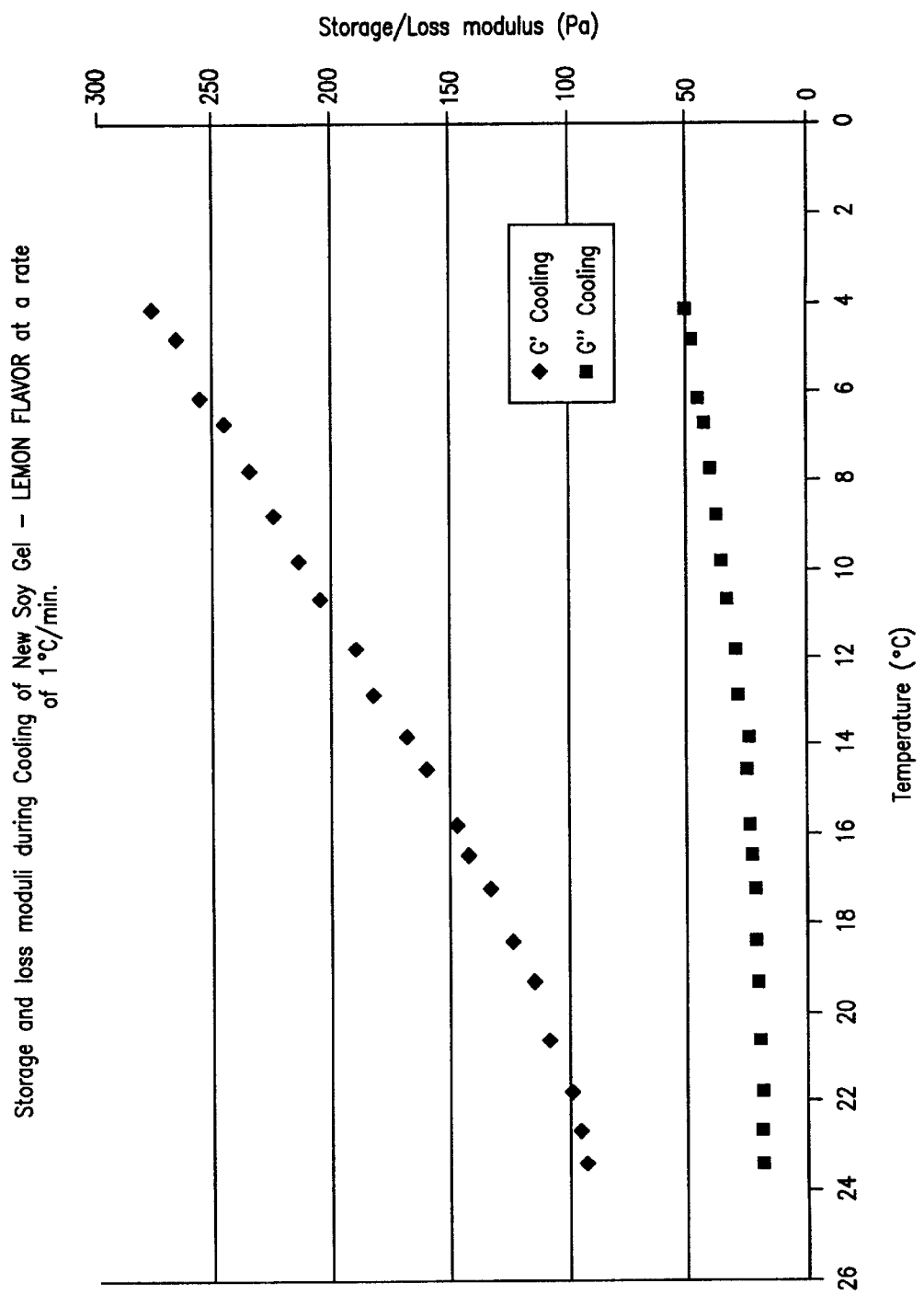
FIGS. 2–7 illustrate the evolution of the storage modulus G' and the loss modulus G" during the cooling phase for various gelling systems.
Figure 3:
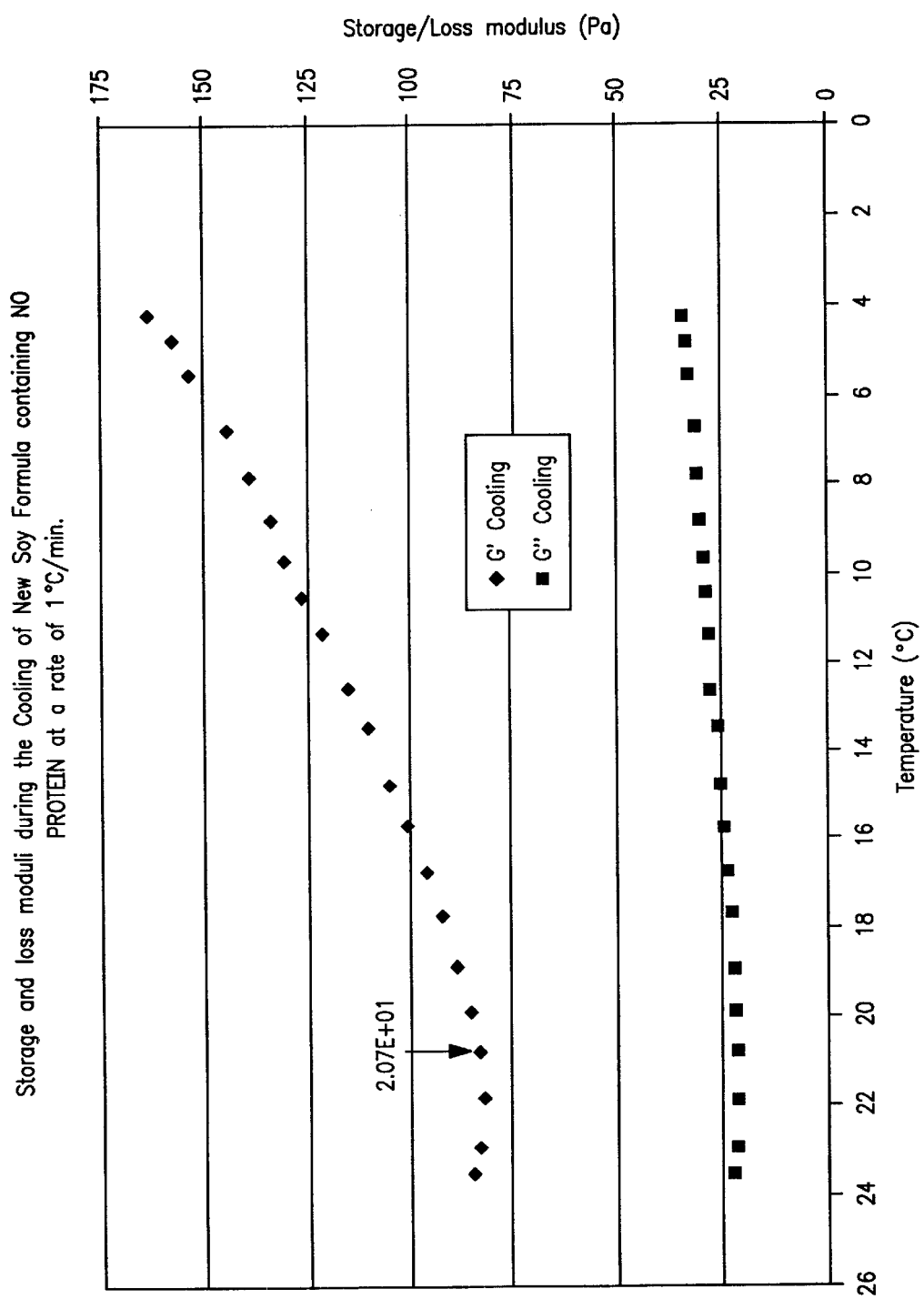
Figure 4:
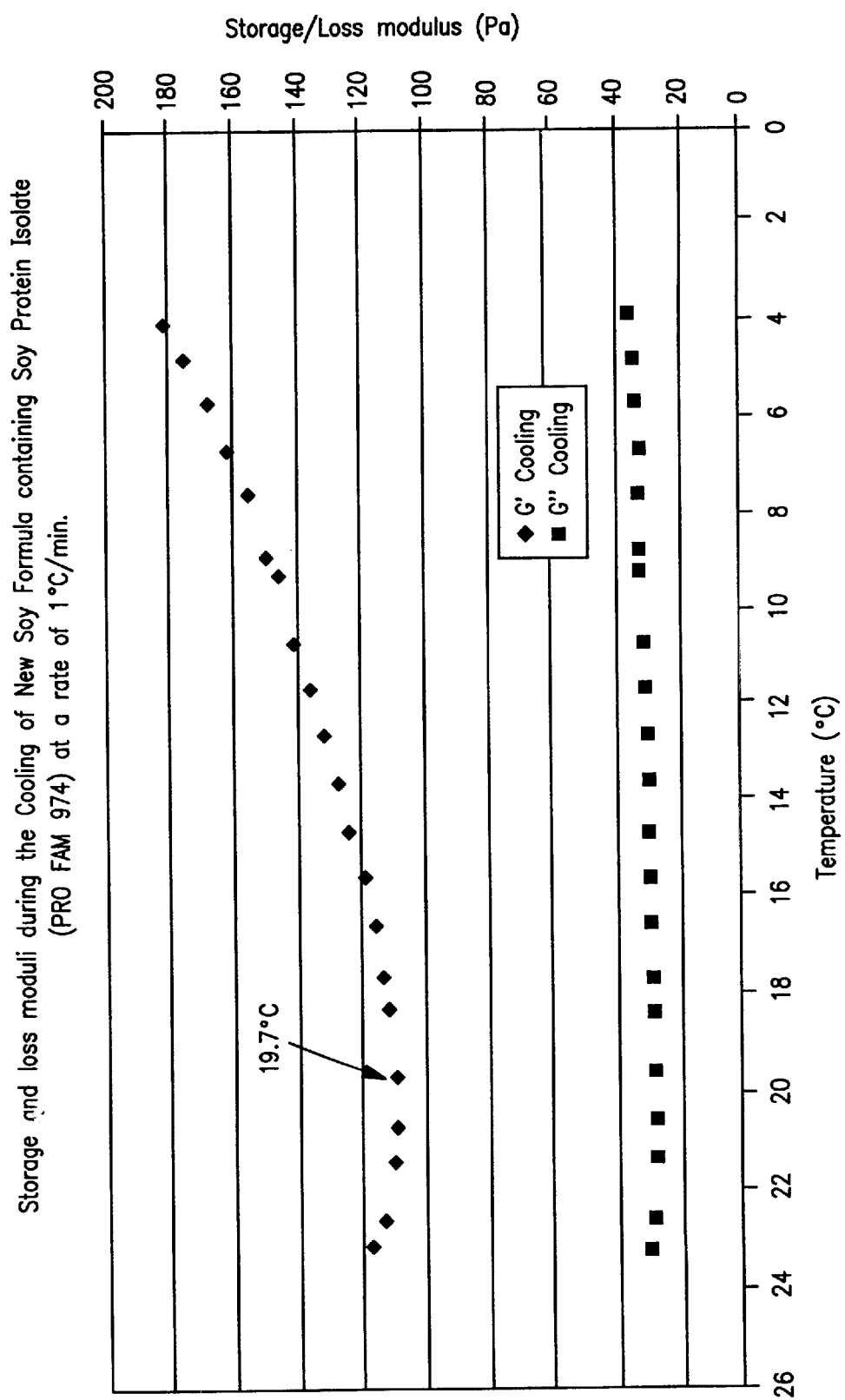
Figure 5:
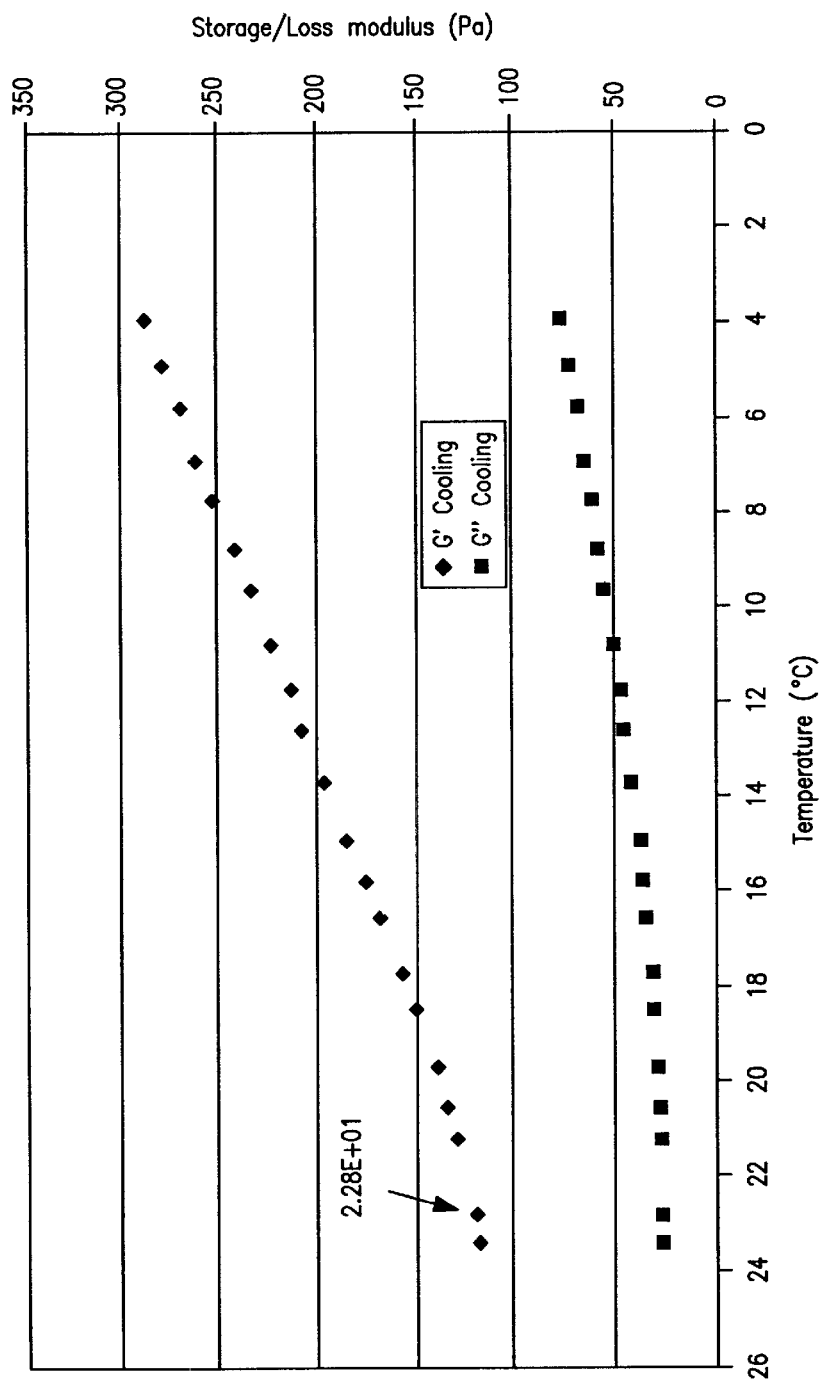
Figure 6:
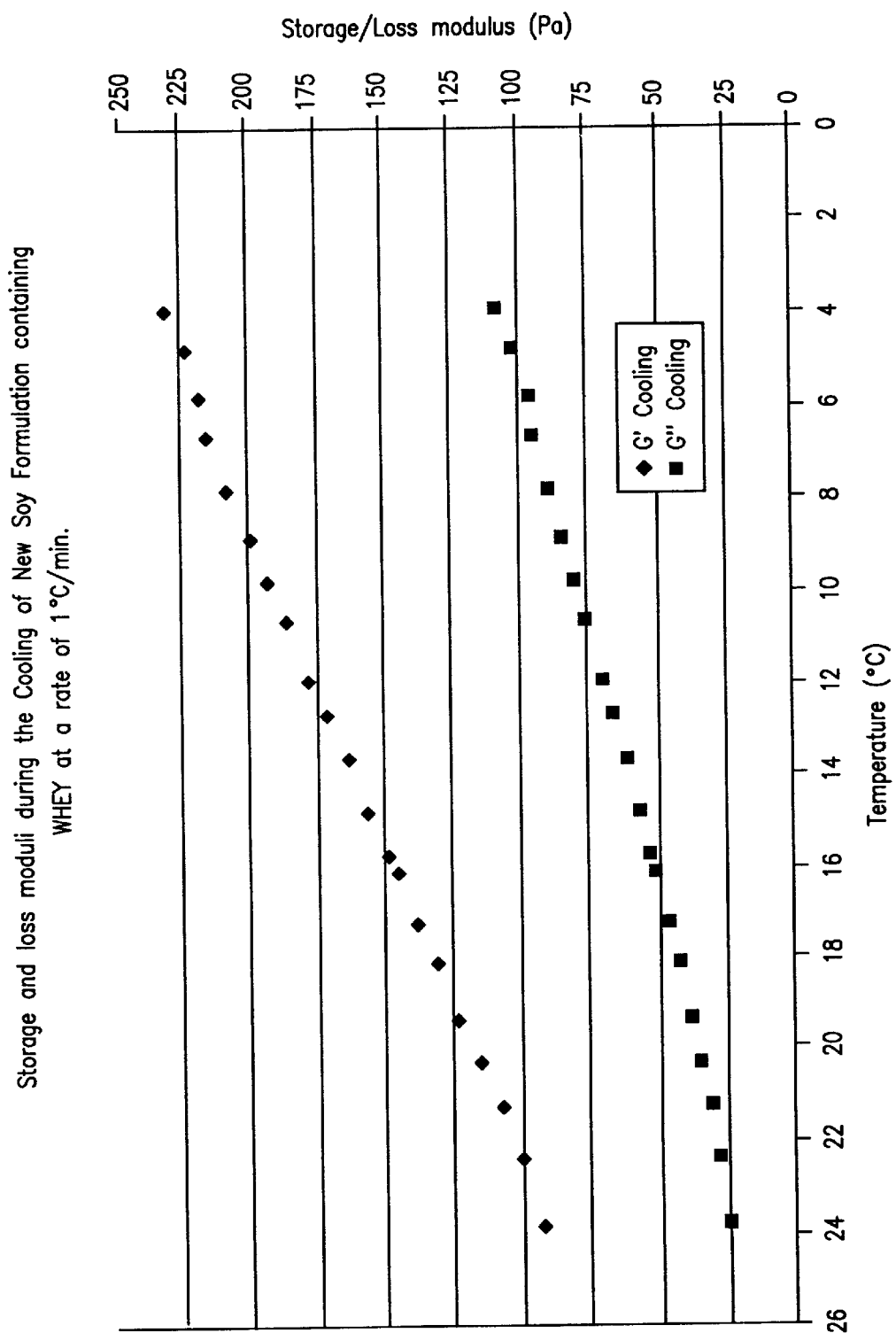
Figure 7:
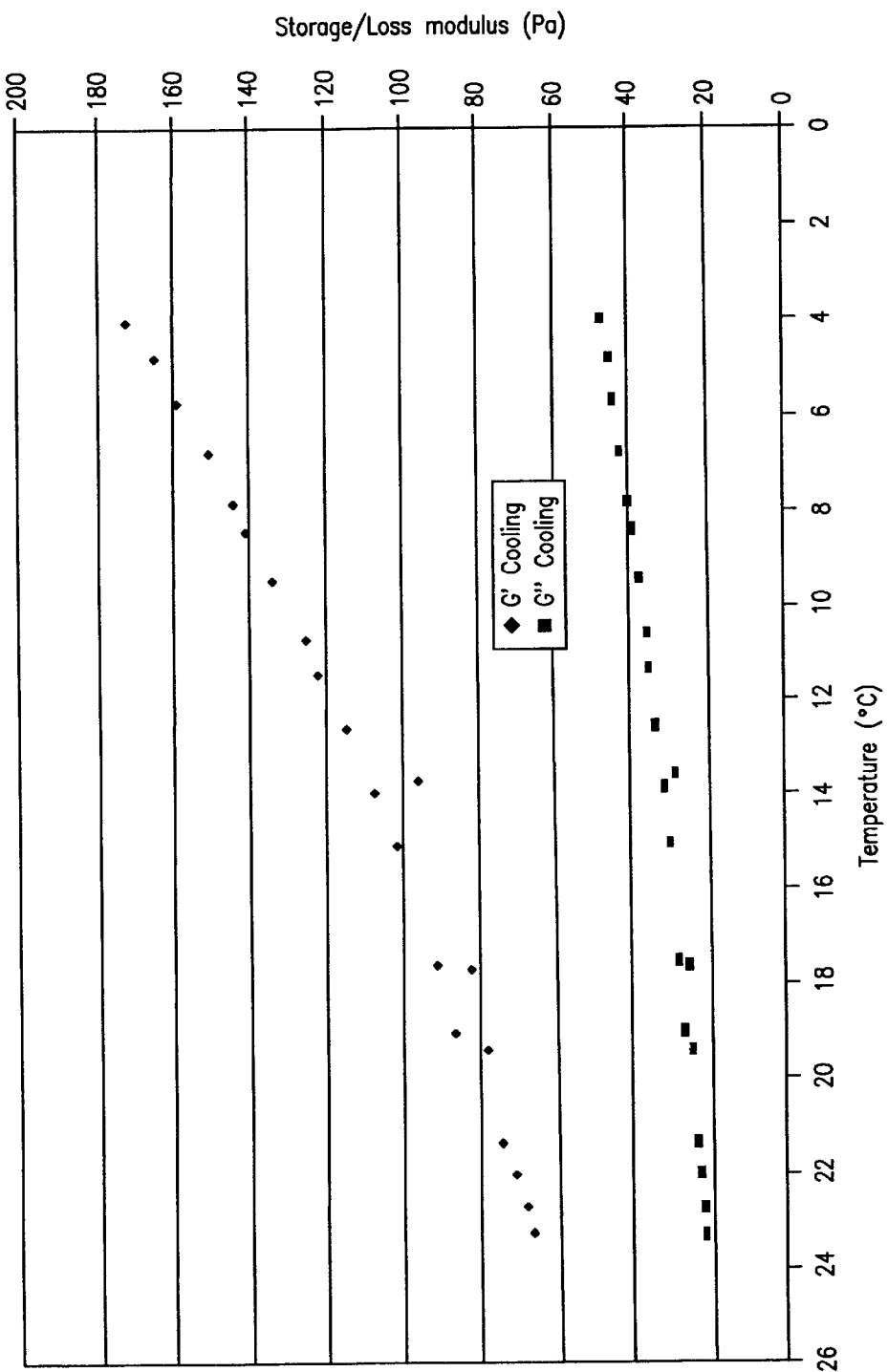

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

The dessert gel of the present invention generally includes a translucent to opaque gelling system, sweeteners, flavorings, colorings, and nutritional additives. In the exemplary embodiments of the present invention, the gelling system includes a liquid component, a gelling agent component, and a protein component. The liquid component of the gelling system is preferably water but could also be fruit juice or another water based liquid. In general, the liquid component of the gelling system serves as a hydrating and carrier function for the dessert gel.

The gelling agent component of the dessert gel preferably includes carrageenan, and more particularly consists essentially of Genugel type LC4 a kappa-carrageenan/iota-carrageenan mixture manufactured by Hercules of Wilmington, Del. While not tested, other types of gelling agents known to those of ordinary skill in the industry in combination with the liquid component and the protein component may also produce suitable dessert gels. In general, the carrageenan of the preferred embodiment causes gelation of the liquid component of the gelling system, and in exemplary embodiments the gelling agent comprises about 0.43% to about 1.204%, about 0.62% to about 1.204%, about 0.62% to about 0.85%, or about 0.806% to about 0.85% by weight of the resulting dessert gel.

In a preferred embodiment of the dessert gel, the protein component of the gelling system includes a soy protein isolate having high gelling characteristics, and more particularly includes PROFAM 974 soy protein isolate having a protein content by weight of 90% and manufactured by ADM of Decatur, Ill. Acceptable but lesser quality dessert gels of the present invention have been achieved by using in place of the soy protein isolate: soy protein concentrate in particular Arcon F soy protein concentrate having a protein content by weight of 69% and manufactured by ADM of Decatur, Ill.; whey having a protein content by weight of 50% and manufactured by Davisco International of Le Sueur, Minn.; and sodium caseinate having a protein content by weight of 94% and manufactured by ICN Biochemicals of Cleveland, Ohio.

It is expected that suitable gelling systems may be achieved by using whey protein isolate and other water soluble proteins derived from various animal and vegetable sources. The protein of the gelling system generally enhances the overall gelling system by (i) increasing the strength of the resulting gel, (ii) decreasing the rate of syneresis (i.e. decreasing the rate the liquid component exudes from the structure of the gelling system), and (iii) increasing the nutritional value of the dessert gel. As will be discussed below, suitable gelling systems for dessert gels have been formed with a protein component comprising at least 50%, at least 69%, at least 90%, or at least 94% protein by weight. Mixtures of the above proteins or other sources of proteins could result in suitable gelling systems being formed with a protein component comprising about 50% to about 94%, about 69% to about 94%, or about 69% to about 90% protein by weight.

In the exemplary embodiments, the dessert gel includes crystalline fructose which may be obtained from A. E. Staley of Lafayette, Ind. However, it is contemplated that other sweeteners may also be used to impart the desired level of sweetness to the dessert gel such as saccharin, sucrose, aspartame, sorbitol, cane sugar, rice syrup, as well as others. In the exemplary embodiments, the dessert gel also includes flavorings such as cherry, lemon, and orange which may be obtained from Universal Flavors, Inc. a division of Universal Foods of Milwaukee, Wis. Again, other flavorings and sources of flavorings are contemplated for use with the dessert gel of the present invention. In order to provide the dessert gel with additional tartness, some of the exemplary dessert gels include ascorbic acid (Vitamin C) which also provides additional nutritional value. It is contemplated that the dessert gel may be produced without ascorbic acid or may be produced with other ingredients to impart an appropriate flavor to the dessert gel.

In a preferred embodiment, the dessert gel includes various nutritional additives such as soy isoflavones and calcium from calcium gluconate. Various research has indicated that soy isoflavones may provide many health benefits such as reducing menopause systems and helping to combat various forms of cancer. Among other things, calcium aids in maintaining strong teeth and bones, and helps prevent or slow osteoporosis a disease in which bones become porous and brittle. It is further contemplated that the dessert gel may include other nutritional additives such as other vitamins and other minerals.

Texture, Taste and Syneresis Testing of Dessert Gels Comprising Soy Protein Isolate Gelling systems comprising carrageenan as the primary gelling agent tend to exude water from their matrices over time. This exudation of water (i.e. syneresis) leads to a decrease in firmness, an increase in moisture, and bad mouth feel. Tests were performed to evaluate the exudation of the liquid component from the structure of dessert gel (i.e. syneresis) over time, the taste of the dessert gel, and the mouth feel (i.e. texture) of the dessert gel. In particular, the syneresis test was performed to determine a satisfactory protein and carrageen mix.

Gel Determination for Limiting Syneresis Test

Various gelling systems were formed from 80 g of crystalline fructose, 2 g of soy protein isolate, varying amounts of carrageen, and 0.02 g of annatto (coloring). These gelling systems were formed without any flavoring or nutritional additives such as isoflavones, ascorbic acid or calcium gluconate. In particular, five different gelling systems were formed with each having a different level of carrageen ranging from 0.5 % of the total water component to 2.5% of the total water component.

TABLE 1

Carrageenan at 0.5% of total water weight.

| Component | % By Weight | Amount used (g) |
|---|---|---|
| Fructose | 18.232 | 80.000 |
| Carrageenan | 0.405 | 1.775 |
| Soy Protein Isolate | 0.456 | 2.000 |
| Water | 80.903 | 355.000 |
| Annatto Coloring | 0.005 | 0.020 |
| Total | 100.000 | 438.795 |

TABLE 2

Carrageenan at 1.0% of total water weight.

| Component | % | Amount used (g) |
|---|---|---|
| Fructose | 18.158 | 80.000 |
| Carrageenan | 0.806 | 3.550 |
| Soy Protein Isolate | 0.454 | 2.000 |
| Water | 80.577 | 355.000 |
| Annatto Coloring | 0.005 | 0.020 |
| Total | 100.000 | 440.570 |

TABLE 3

Carrageenan at 1.5% of total water weight.

| Component | % | Amount used (g) |
|---|---|---|
| Fructose | 18.085 | 80.000 |
| Carrageenan | 1.204 | 5.325 |
| Soy Protein Isolate | 0.452 | 2.000 |
| Water | 80.254 | 355.000 |
| Annatto Coloring | 0.005 | 0.020 |
| Total | 100.000 | 442.345 |

TABLE 4

Carrageenan at 2.0% of total water weight.

| Component | % | Amount used (g) |
|---|---|---|
| Fructose | 18.013 | 80.000 |
| Carrageenan | 1.599 | 7.100 |
| Soy Protein Isolate | 0.450 | 2.000 |
| Water | 79.933 | 355.000 |
| Annatto Coloring | 0.005 | 0.020 |
| Total | 100.000 | 444.120 |

TABLE 5

Carrageenan at 2.5% of total water weight.

| Component | % | Amount used (g) |
|---|---|---|
| Fructose | 17.941 | 80.000 |
| Carrageenan | 1.990 | 8.875 |
| Soy Protein Isolate | 0.449 | 2.000 |
| Water | 79.615 | 355.000 |
| Annatto Coloring | 0.004 | 0.020 |
| Total | 100.000 | 445.895 |

In particular, the above gel systems were formed by respectively adding 80 g of fructose, the indicated amount of carrageenan, and 2 g of soy protein isolate to a 400 ml beaker. After adding the above dry ingredients to the beaker, 0.020 g of annatto was added to the dry mixture in the beaker. Annatto liquid 'miscelles' were broken up using the pestle and mortar method until the desired color was achieved. The dry mixture including the annatto was then mixed with 355 ml (i.e. 1.5 Cups) of boiling water. The water and dry mixture were mixed well for 2 minutes at which time approximately 180 ml samples were poured into a 400 ml beaker and refrigerated for two hours. The gel systems were then taken out of the beaker and placed upside down in a petri dish.

The gelling systems were then allowed to cool for two hours at which time height measurements of each gelling system were taken in three-hour increments with Vernier calipers. Data was taken at room temperature (24° C.) because this would be the most extreme condition that a dessert gel would most likely need to endure. The data could then be extrapolated to refrigerator temperature, where the gelling systems should hold water much longer. Below Table 6 shows the raw height data obtained and Table 7 shows the corresponding percent sag, where:

$$\text{percent\_sag}(t) = 1 - \text{Height}(t)/\text{Height}_{initial}$$

TABLE 6

Transient Height Data of Gelling Systems Over a 12-Hour Span at 24° C.

| % Carrageen with respect to Water | 0 Hour | 3 Hour | 6 hour | 9 hour | 12 hour |
|---|---|---|---|---|---|
| 0.5 | 2.2 | 2 | 1.7 | 1.5 | 1.4 |
| 1.0 | 2.6 | 2.5 | 2.2 | 2.2 | 2.2 |
| 1.5 | 2.9 | 2.7 | 2.6 | 2.6 | 2.5 |
| 2.0 | 3.2 | 3.1 | 3.1 | 3.1 | 3.1 |
| 2.5 | 3.2 | 3.1 | 3 | 3 | 3 |

TABLE 7

Transient Percent Sag Data of Gelling Systems Over a 12-Hour Span at 24° C.

| % Carrageen with respect to Water | 0 Hour | 3 Hour | 6 hour | 9 hour | 12 hour |
|---|---|---|---|---|---|
| 0.5 | 0% | 9.1% | 22.7% | 25% | 36.3% |
| 1.0 | 0% | 3.8% | 15.4% | 15.4% | 15.4% |
| 1.5 | 0% | 7.0% | 10.3% | 10.3% | 13.8% |
| 2.0 | 0% | 3.1% | 3.1% | 3.1% | 3.1% |
| 2.5 | 0% | 3.1% | 6.3% | 6.3% | 6.3% |

The experiment showed that the gelling systems with the highest concentrations of carrageenan tend to exude less water, but have a hockey-puck like texture. The gelling system with the lowest carrageenan concentration showed to be too weak and experienced a 36.3% decrease in height. The gelling system with 1%, or a little over 1% carrargeenan was found to be the best of the above gelling systems. This was determined by the fact that the 1% carrageenan gelling system had an appropriate texture right out of the refrigerator and mostly maintained its height 3 to 6 hours. This leads to the conclusion that if the 1% carrageenan gelling system were taken directly from the refrigerator and eaten, the gelling system would be very enjoyable due to its relatively smooth but firm texture. If the 1% carrageenan gelling system were subjected to a worst case scenario of being left out on a table for a day, it would experience minimal (15%) sagging or water loss. Adding more high-gelling protein to the gelling system would theoretically bind more of water in the gelling system, thus allowing a more temperature and time resistant carrageenan base gelling system.

Taste Testing

A "Descriptive Analysis" using "structure category scaling" according to methods shown in "The Food Chemistry Laboratory" (Connie Weaver, 1996), per the International Food Technologist guidelines was constructed. In particular, a separate survey was constructed for each of the three flavors tested (cherry, lemon, and orange). The taste test survey for the cherry flavored dessert gel is depicted in FIG. 1. Very similar taste test surveys were constructed for the lemon flavored dessert gel and the orange flavored dessert gel. The dessert gels were made in a fashion similar to above.

For each flavor of dessert gel tested, two different samples were prepared with the ingredients indicated in Tables 8 through 15 as follows:

TABLE 8

Sample A of Cherry Flavored Dessert Gel

| Component | % By Weight | Amount used (g) |
|---|---|---|
| Fructose | 15.75 | 68 |
| Soy Protein Isolate | 0.46 | 2 |
| Isoflavones | 0.12 | 0.50g |
| Carrageenan | 0.85 | 3.65 |
| Ascorbic Acid | 0.06 | 0.25 |
| Calcium Gluconate | 0.10 | 0.45 |
| Cherry Flavoring | 0.30 | 1.3 |
| Water | 82.23 | 355 |
| Dry Annatto | 0.02 | 0.1 |
| Liquid Annatto | 0.11 | 0.47 |
| Total | 100.00 | 431.72 |

TABLE 9

Sample B of Cherry Flavored Dessert Gel

| Component | % By Weight | Amount used (g) |
|---|---|---|
| Fructose | 17.28 | 76 |
| Soy Protein Isolate | 0.45 | 2 |
| Isoflavones | 0.11 | 0.50g |
| Carrageenan | 0.83 | 3.65 |
| Ascorbic Acid | 0.06 | 0.25 |
| Calcium Gluconate | 0.10 | 0.45 |
| Cherry Flavoring | 0.30 | 1.3 |
| Water | 80.73 | 355 |
| Dry Annatto | 0.02 | 0.1 |
| Liquid Annatto | 0.11 | 0.47 |
| Total | 100.00 | 439.72 |

TABLE 10

Sample A of Lemon Flavored Dessert Gel

| Component | % By Weight | Amount used (g) |
|---|---|---|
| Fructose | 15.77 | 68 |
| Soy Protein Isolate | 0.46 | 2 |
| Isoflavones | 0.12 | 0.50g |
| Carrageenan | 0.85 | 3.65 |
| Ascorbic Acid | 0.06 | 0.25 |
| Calcium Gluconate | 0.10 | 0.45 |
| Lemon Flavoring | 0.30 | 1.3 |
| Water | 82.33 | 355 |
| Liquid Annatto | 0.01 | 0.03 |
| Total | 100.00 | 431.18 |

TABLE 11

Sample B of Lemon Flavored Dessert Gel

| Component | % By Weight | Amount used (g) |
|---|---|---|
| Fructose | 17.31 | 76 |
| Soy Protein Isolate | 0.46 | 2 |
| Isoflavones | 0.11 | 0.50g |
| Carrageenan | 0.83 | 3.65 |
| Ascorbic Acid | 0.06 | 0.25 |
| Calcium Gluconate | 0.10 | 0.45 |
| Lemon Flavoring | 0.30 | 1.3 |
| Water | 80.83 | 355 |
| Liquid Annatto | 0.01 | 0.03 |
| Total | 100.00 | 439.18 |

TABLE 12

Sample A of Orange Flavored Dessert Gel

| Component | % By Weight | Amount used (g) |
|---|---|---|
| Fructose | 15.77 | 68 |
| Soy Protein Isolate | 0.46 | 2 |
| Isoflavones | 0.12 | 0.50g |
| Carrageenan | 0.85 | 3.65 |
| Ascorbic Acid | 0.06 | 0.25 |
| Calcium Gluconate | 0.10 | 0.45 |
| Orange Flavoring | 0.30 | 1.3 |
| Water | 82.32 | 355 |
| Liquid Annatto | 0.02 | 0.1 |
| Total | 100.00 | 431.25 |

TABLE 13

Sample B of Orange Flavored Dessert Gel

| Component | % By Weight | Amount used (g) |
|---|---|---|
| Fructose | 17.30 | 76 |
| Soy Protein Isolate | 0.46 | 2 |
| Isoflavones | 0.11 | 0.50g |
| Carrageenan | 0.83 | 3.65 |
| Ascorbic Acid | 0.06 | 0.25 |
| Calcium Gluconate | 0.10 | 0.45 |
| Orange Flavoring | 0.30 | 1.3 |
| Water | 80.82 | 355 |
| Liquid Annatto | 0.02 | 0.1 |
| Total | 100.00 | 439.25 |

Taste Test Data Analysis

The surveys allowed each tester to assign to each sample one of seven taste ratings ranging from "Like extremely" (6) to "Dislike extremely" (0). Similarly, the surveys allowed each tester to assign to each sample one of seven texture ratings ranging from "Like extremely" (6) to "Dislike extremely" (0). The rankings for each sample were averaged to obtain an average taste rating $Taste_{average}$ and an average texture rating $Texture_{average}$ for each sample.

The taste test provided information which aided in reformulating the dessert gels. The general consensus of the testers from the initial round of testing was that the texture was great, or "like very much." However, the data corresponding to taste was not satisfactory at all. The most common responses were "neither like nor dislike" and "like moderately". After another day's worth of testing and adjusting the fructose, ascorbic acid, and flavorings, a dessert gel formulation was obtained having suitable taste and texture properties. In particular, the flavorings were dramatically increased, the fructose was slightly increased, and the ascorbic acid was increased to provide more tartness. After reformulation, the dessert gels were found to be like common gelatin snacks in both taste and texture. The ingredient levels of the reformulated dessert gels are provided in Tables 14 through 16 which follow:

TABLE 14

Reformulated Cherry Flavored Dessert Gel

| Component | % By Weight | Amount used (g) |
|---|---|---|
| Fructose | 17.97 | 80 |
| Soy Protein Isolate | 0.45 | 2 |
| Isoflavones | 0.11 | 0.50g |
| Carrageenan | 0.82 | 3.65 |
| Ascorbic Acid | 0.06 | 0.25 |
| Calcium Gluconate | 0.10 | 0.45 |
| Cherry Flavoring | 0.63 | 2.8 |
| Water | 79.74 | 355 |
| Dry Annatto | 0.02 | 0.1 |
| Liquid Annatto | 0.11 | 0.47 |
| Total | 100.00 | 445.22 |

TABLE 15

Reformulated Lemon Flavored Dessert Gel

| Component | % By Weight | Amount used (g) |
|---|---|---|
| Fructose | 18.04 | 80 |
| Soy Protein Isolate | 0.45 | 2 |
| Isoflavones | 0.11 | 0.50g |
| Carrageenan | 0.82 | 3.65 |
| Ascorbic Acid | 0.06 | 0.25 |
| Calcium Gluconate | 0.10 | 0.45 |
| Lemon Flavoring | 0.36 | 1.6 |
| Water | 80.05 | 355 |
| Liquid Annatto | 0.01 | 0.03 |
| Total | 100.00 | 443.48 |

TABLE 16

Reformulated Orange Flavored Dessert Gel

| Component | % By Weight | Amount used (g) |
|---|---|---|
| Fructose | 18.03 | 80 |
| Soy Protein Isolate | 0.45 | 2 |
| Isoflavones | 0.11 | 0.50g |
| Carrageenan | 0.82 | 3.65 |
| Ascorbic Acid | 0.06 | 0.25 |
| Calcium Gluconate | 0.10 | 0.45 |
| Orange Flavoring | 0.41 | 1.8 |
| Water | 80.00 | 355 |
| Liquid Annatto | 0.02 | 0.1 |
| Total | 100.00 | 443.75 |

Comparative Protein Testing

Further texture and gelatin kinetic tests were performed on the above reformulated dessert gels and other gelling systems that include other water soluble protein components such as soy protein concentrate, whey, and sodium caseinate. The main objectives of these additional tests were to (i) determine whether dessert gels made with soy protein isolate have better characteristics than gels made from other proteins, and (ii) whether suitable dessert gels could be made with other proteins. As will be explained in more detail below, the comparative protein testing indicated that the dessert gels made with soy protein isolate do in fact have better characteristics than dessert gels made with the other tested proteins.

Gelling System Formation For Comparative Protein Testing

Cherry flavored dessert gels, orange flavored dessert gels, and lemon flavored dessert gels were prepared with the ingredients indicated in Tables 14 through 16. Gelling systems with or without protein and having a similar composition as the gelling systems of the reformulated cherry, orange, and lemon dessert gels were also prepared. The base composition of the gelling systems is provided in Table 17 along with the volume of water used in making each gelling system. All gelling systems and the cherry, orange, and lemon dessert gels were made by making a dry mix containing all solid ingredients, followed by addition of boiling water to the dry mix in a round glass beaker. The dispersion obtained was stirred (with heating if necessary) until all gelling materials were properly dissolved or dispersed. The glass beaker containing the gelling system was allowed to cool to room temperature, then placed in a refrigerator and held for two (2) hours. For kinetics of gelation measurement, the gelling solution was placed in the sample compartment of a mechanical rheometer.

TABLE 17

Composition of Different Gelling Systems

| Component | Percent By Weight | Amount Used (g) |
| --- | --- | --- |
| Fructose | 18.01 | 21.56 |
| Carrageenan | 0.82 | 0.98 |
| Calcium gluconate | 0.10 | 0.12 |
| PROTEIN | 0.45 | 0.54 |
| Water | 80.62 | 100 |
| Total | 100.00 | 119.73 |

Texture Analysis

Following gelation in the refrigerator, the strength of each gelling system was measured using a Stevens LFRA Texture Analyzer (Textures Technologies Corp., Scarsdale, N.Y.). The gel strength was taken as the amount of force (load) required to push a probe with a round tip 5 mm into the gel in a glass dish at a fixed rate of 2 mm/min.

The reformulated cherry, orange, and lemon dessert gel mixes, when dissolved in distilled water to form gels, had a pH value of about 5.2. The similar dry mixes including different protein components, on the other hand, had pH values ranging from 4.2 to 4.6. All the systems considered formed gels both in the presence and absence of a protein as shown in Table 18. From our knowledge of gelling systems and the results shown in Table 18, it can be concluded that the main gel forming component was carrageenan.

The proteins did cause an increase in gel strength as can be seen from the data in Table 18. The results show that the soy protein isolate (PROFAM 974) increased the gel strength of the carrageenan gel (gel formed without protein) by about 24% while sodium caseinate, soy protein isolate (Arcon F) and whey increased the gel strength of the carrageenan gel by about 35%, 47% and 44%, respectively. Also, the proteins tended to impart color to the gels compared to gels containing no protein.

The cherry flavored gels had suspended particulate material that did not dissolve in water. Other flavored gels did not have this defect and tended to have a more uniform texture. Among the flavored dessert gels made, the cherry flavored gels were the strongest gels while the lemon and orange flavored gels were similar in strength.

TABLE 18

Texture Analyzer Reading of Various Gelling Systems

| System | Texture Analyzer Readings (g) |
| --- | --- |
| Cherry Flavored Gel | 40.0 ± 6.1 |
| Lemon Flavored Gel | 34.0 ± 3.2 |
| Orange Flavored Gel | 30.0 ± 1.8 |
| Basic Gelling System without PROTEIN | 23.0 ± 2.0 |
| Basic Gelling System with soy protein isolate | 28.5 ± 2.6 |
| Basic Gelling System with soy protein concentrate | 33.8 ± 1.2 |
| Basic Gelling System with whey | 33.3 ± 1.7 |
| Basic Gelling System with sodium caseinate | 31.0 ± 2.4 |

Gelation Characterization

Gelation and melting kinetics of various gelling systems were determined using a dynamic oscillatory mechanical rheometer (Viscotech, Rheologica Instruments AB, Sweden). A small amount of sample (<5 ml) was placed into the sample holder (about 3 mm deep) of the rheometer. A plate attached to the instrument crosshead was moved into position in the sample holder on the lower plate. The sample was cooled from 24° C. to 4° C. at a constant rate of 1° C./min using liquid nitrogen to cool the sample chamber. The upper plate attached to the rheometer crosshead was rotated at a frequency of 1 Hz and the strain applied to the sample was maintained at 3%. The temperature of the sample chamber was then maintained at 4° C. while the instrument measured and recorded the evolution of storage modulus G' and loss modulus G" over a period of 75 minutes. At the end of a 75 minute period, the storage modulus G' and the loss modulus G" of the orange and lemon flavored dessert gels were measured over a frequency range of 0.01 Hz to 10 Hz at 4° C. Finally, in order to simulate melting, the gelling system in the sample chamber was heated from 4° C. to 37° C. at a rate of 1° C./min while the storage modulus G' and the loss modulus G" were monitored.

Determination of the Gelation Temperature

The gelation temperature $T_g$, was taken to be the temperature at which a sudden rise in the magnitude of storage modulus G', resulting in subsequent increase in the difference between the storage modulus G' and the loss modulus G".

Determination of Gelation Rate

The evolution of the storage modulus G' over time during gelation was fitted to a first order kinetics $$G'(t) = G'_{max}[1 - exp(-kt)] \quad (1)$$

where $G'_{max}$ is the value of the storage modulus G' at the end of the holding period, t is the gelation time, and k is the gelation rate constant. The gelation rate constants k for all systems investigated were calculated for the first 15 minutes of gelation by fitting Equation 1 to the experimental data.

Determination of Gel Strength

The gel strength was estimated to be the value of G' at the end of the 75 minute holding period at 4° C.

Determination of Melting Temperature and Melting Rate

The melting temperature $T_m$ of the gel formed at 4° C. for one (1) hour was determined to be the temperature at which the storage modulus G' started falling as the gel was heated. The melting rate was determined to be the rate of decrease of the storage modulus G' over time after the gelation temperature was reached.

Gelation Characterization

In the manufacture of gels, hot water is added to dry mix with stirring to dissolve solid components. The gelling system is then cooled at a fixed rate to a desired temperature, usually refrigeration temperature, then held at this temperature for the gel to mature. In excellent gelling systems, the storage modulus G' and the loss modulus G" are very similar during the early stages of cooling when no gel network is being formed. The storage modulus G', is a measure of energy stored during gel network formation and represents gel elasticity. The loss modulus G", is a measure of energy loss due to friction during gel network formation and represents gel viscosity.

At the gelation temperature, when a gel network begins to form, the storage modulus G' starts increasing rapidly while the loss modulus G" either mains relatively constant or increases only slightly over time. During the holding phase of gelation, the storage modulus G' continues to increase rapidly until it reaches an equilibrium level. Beyond this equilibrium level the rate of increase of the storage modulus G' over time is very small. The loss modulus G", on the other hand, remains very small and does not change significantly over time during both the cooling and holding phases. Overall, the storage modulus G' is a lot higher than the loss modulus G" when a gel network has formed. During heating of the gel or melting, the storage modulus G' remains fairly constant for a while, then begins to decease at a constant rate when the gel melting point $T_m$ is reached. The loss modulus G" does not change significantly during melting.

The cherry flavored gels contained large particles and were not suitable for use in a mechanical rheometer. Thus rheological characterization of these gels were not carried out. The lemon and orange flavored gels were evaluated using a mechanical rheometer; however, the results of the orange flavored gels either were subject to significant error or contained enough large particles to make it not suitable for use in a mechanical rheometer. As a result, only the lemon flavored gel results are presented below.

Determination of Gelation Temperature

The evolution of the storage modulus G' and the loss modulus G" during the cooling phase of gel formation for the lemon flavored gel is shown in FIG. 2. It is evident that gel formation begins even before cooling is started as storage modulus G' is greater than the loss modulus G" at 24° C. Gelation commenced at about 23° C. (1 minute into the cooling phase) as evidenced by the sudden increase in the storage modulus G' compared to the loss modulus G".

The gelation temperatures induced by cooling for all other gelling systems are summarized in Table 19. The cooling profiles for the other gelling systems investigated are shown in FIGS. 3–7. The gelling system containing no protein had a gelation temperature of 20.7° C. Addition of soy protein isolate (PROFAM 974 ) to the formulation did not affect gelation temperature significantly. Addition of soy protein concentrate, whey, and sodium caseinate increased gelation temperature, thus causing gelation to start sooner during the cooling cycle.

Determination of Gelation Rate

After cooling the gelling systems from 24° C. to 4° C. at a rate of 1° C./min, the gelling systems were held at 4° C. for 75 min each. The evolution of storage modulus G' and the loss modulus G" over time are shown in FIGS. 8–13. Overall, the gelling systems exhibited good gelling behavior. In particular, the storage modulus G' was significantly higher than the loss modulus G" throughout the holding period.

Figure 8:
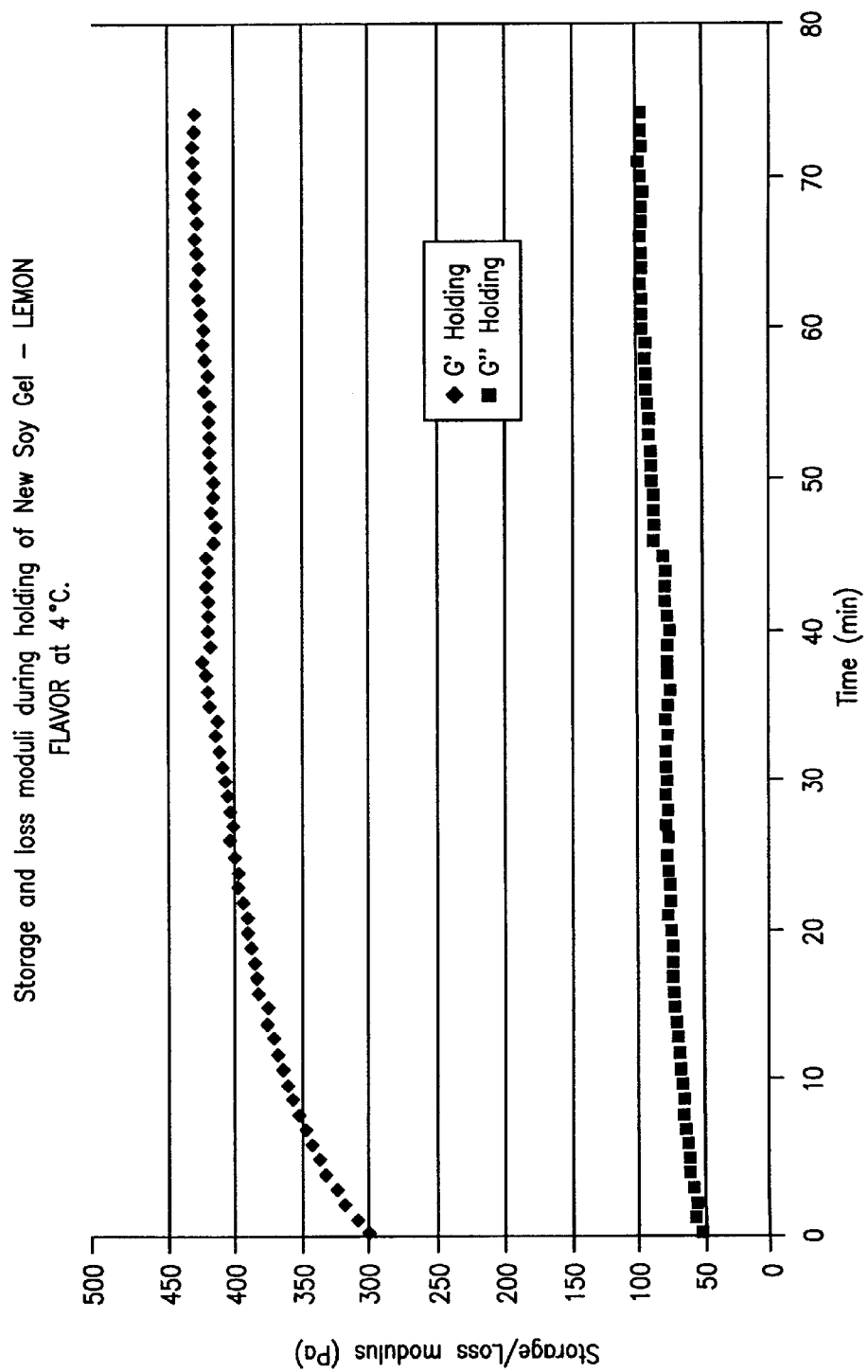
FIGS. 8–13 illustrate the evolution of the storage modulus G' and the loss modulus G" during the holding phase for various gelling systems.
Figure 9:
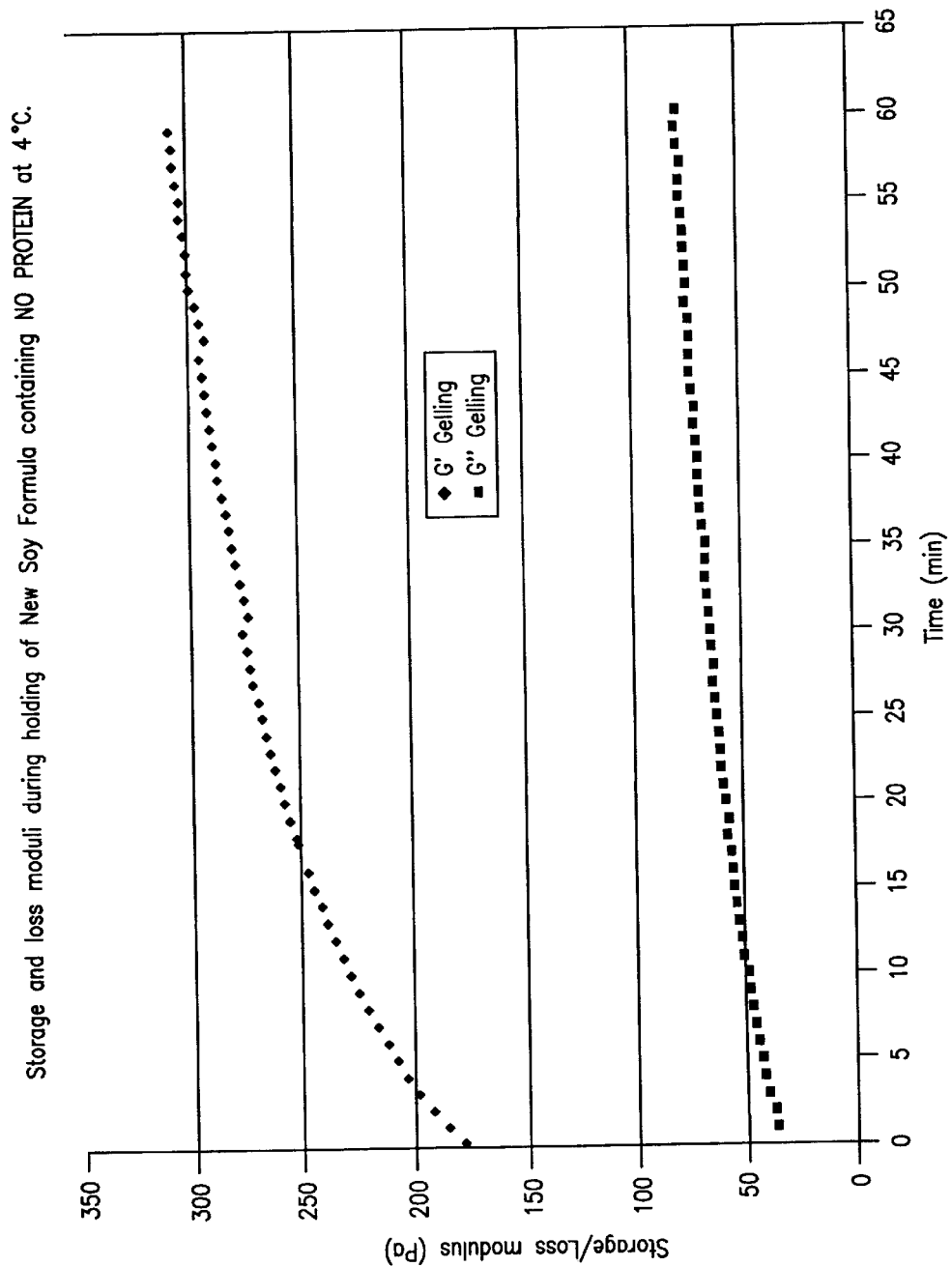
Figure 10:
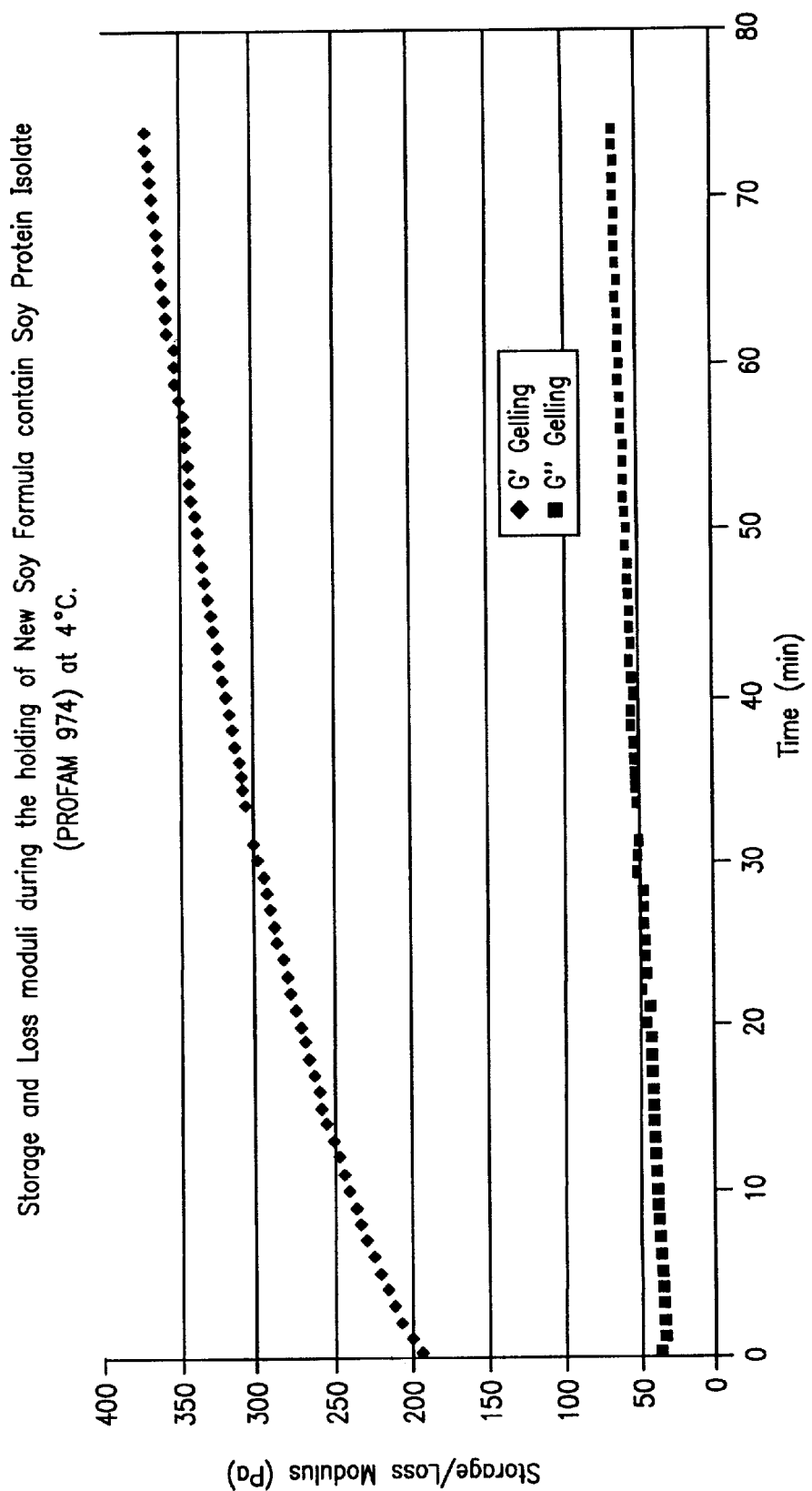
Figure 11:
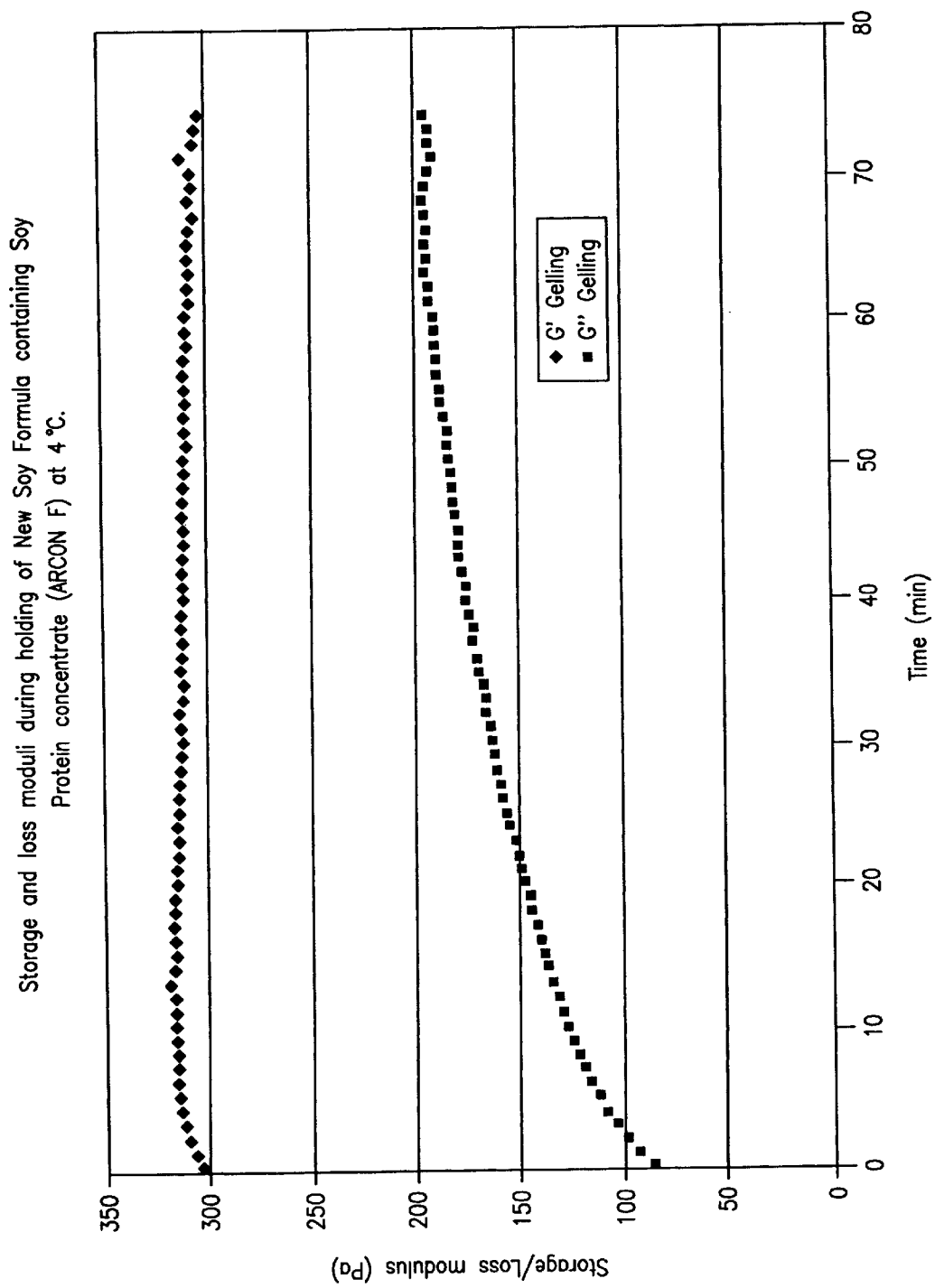
Figure 12:
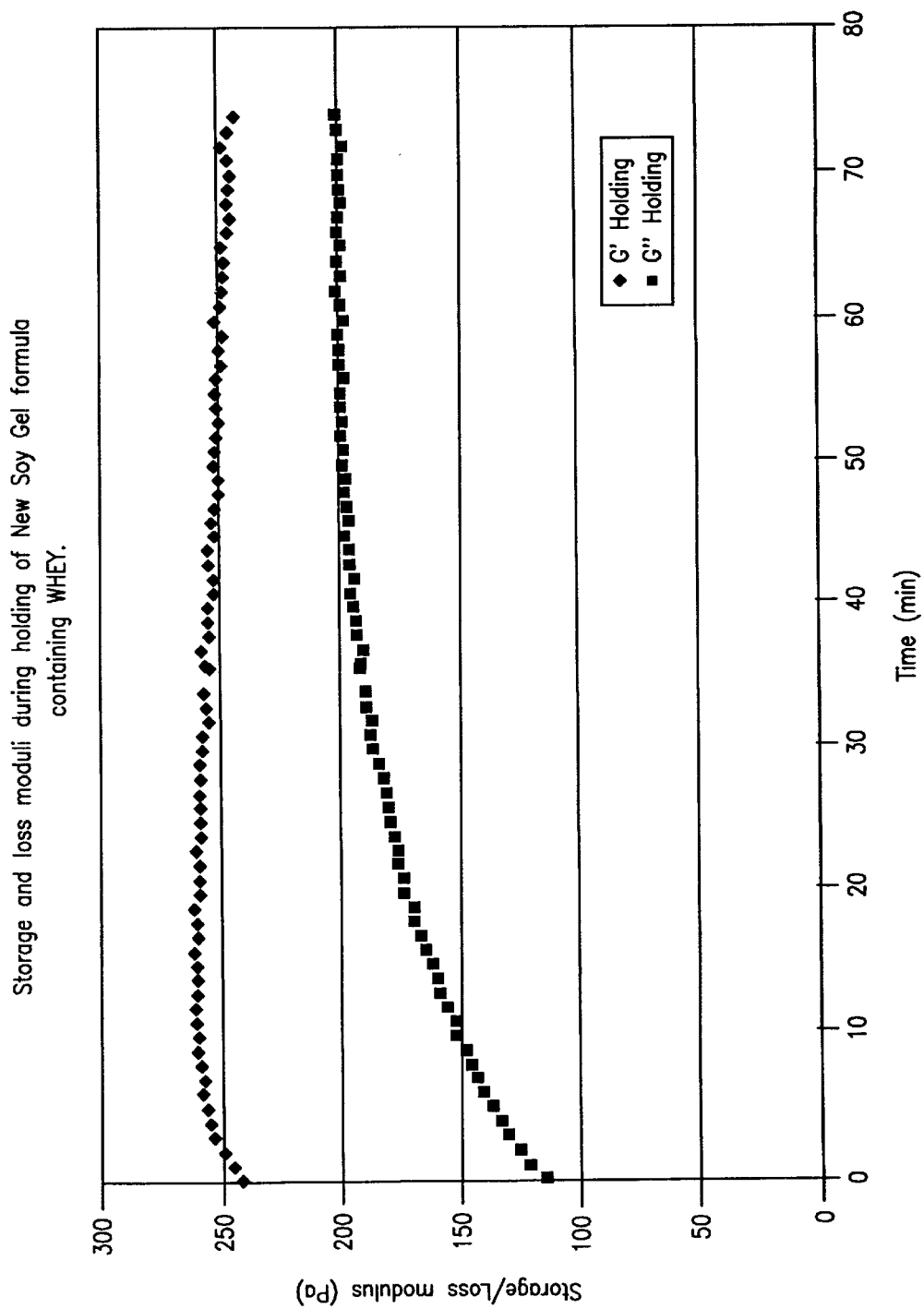
Figure 13:
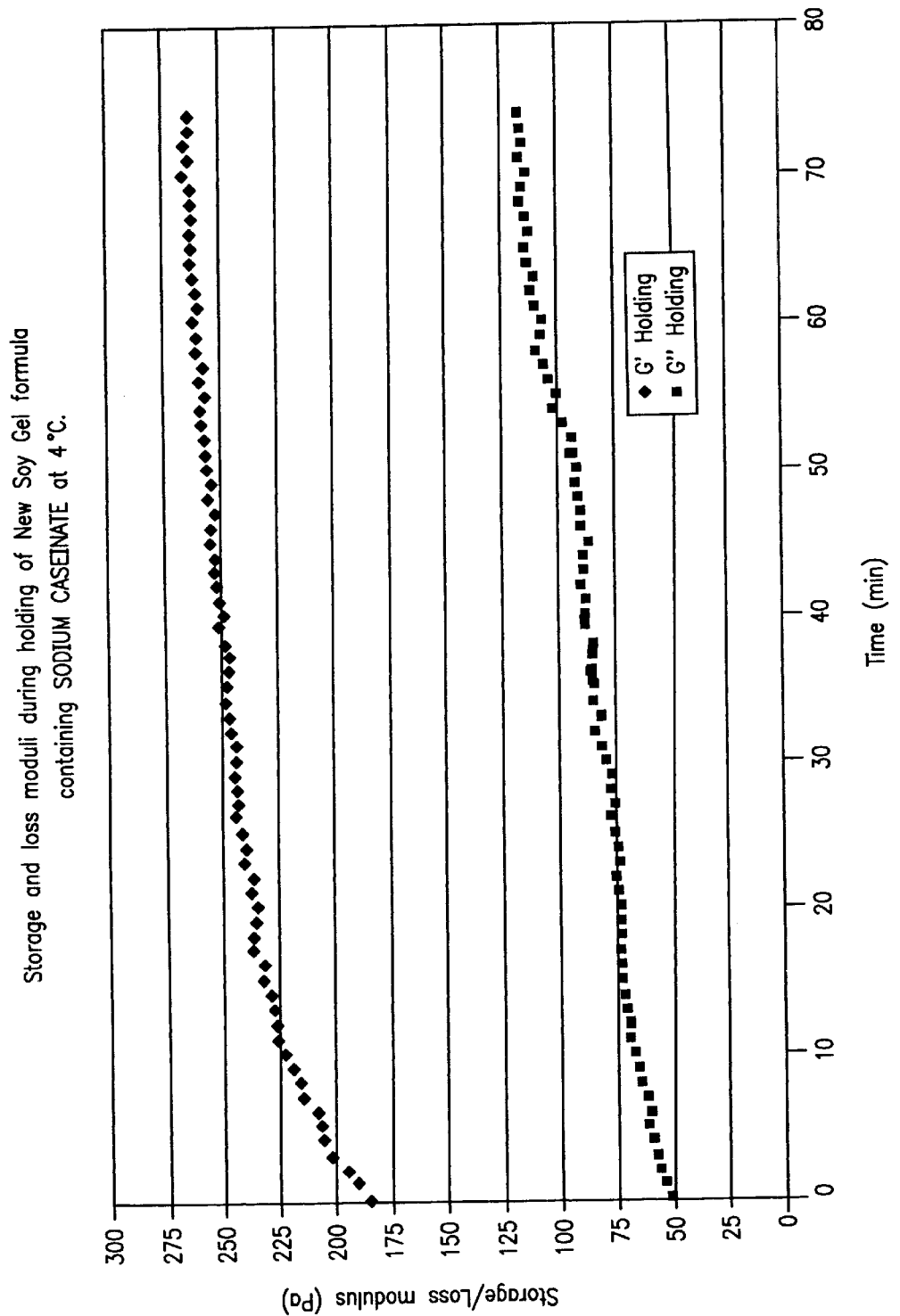
Figure 14:
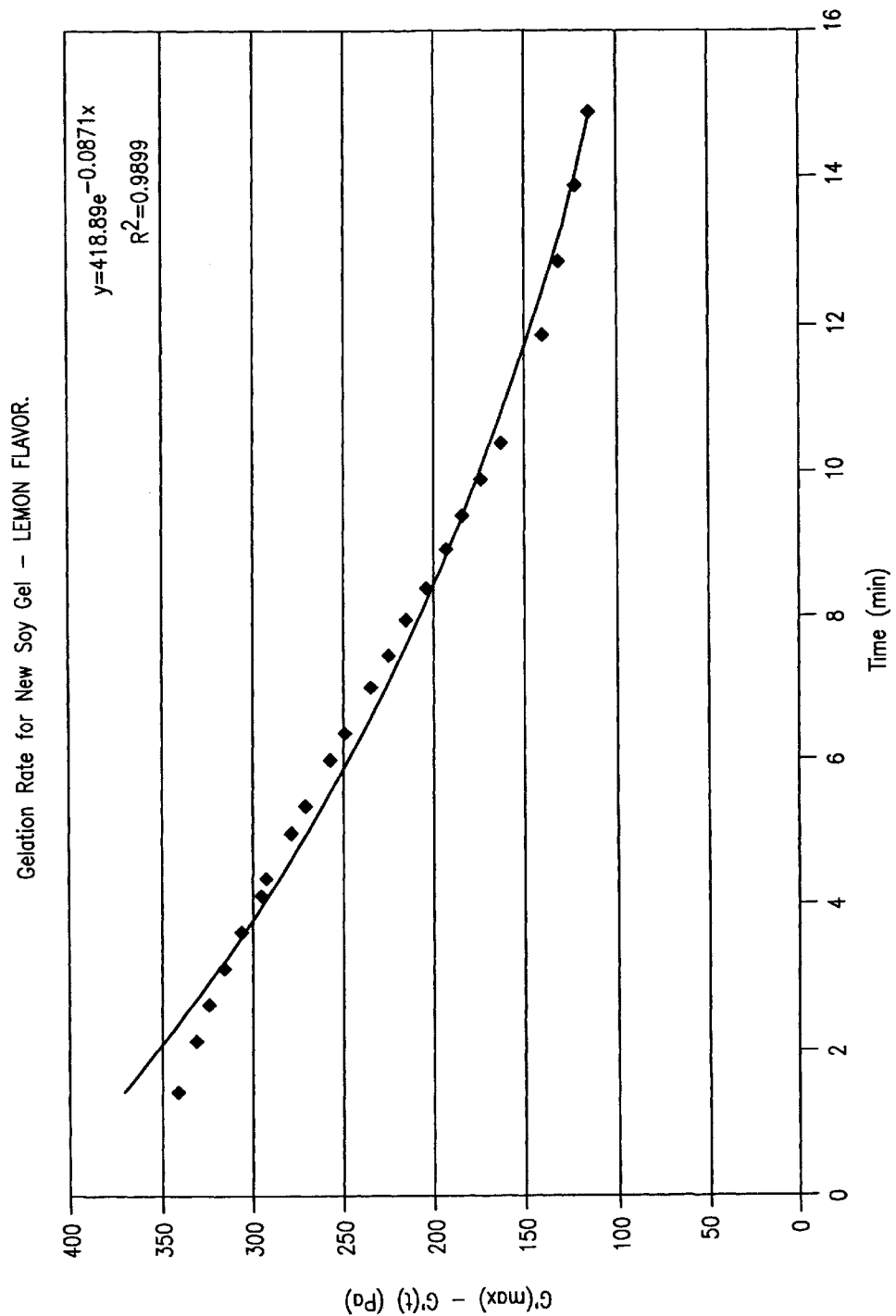
FIGS. 14–19 illustrate the gellation rate of various gelling systems during the first 15 minutes of the holding phase.
Figure 15:
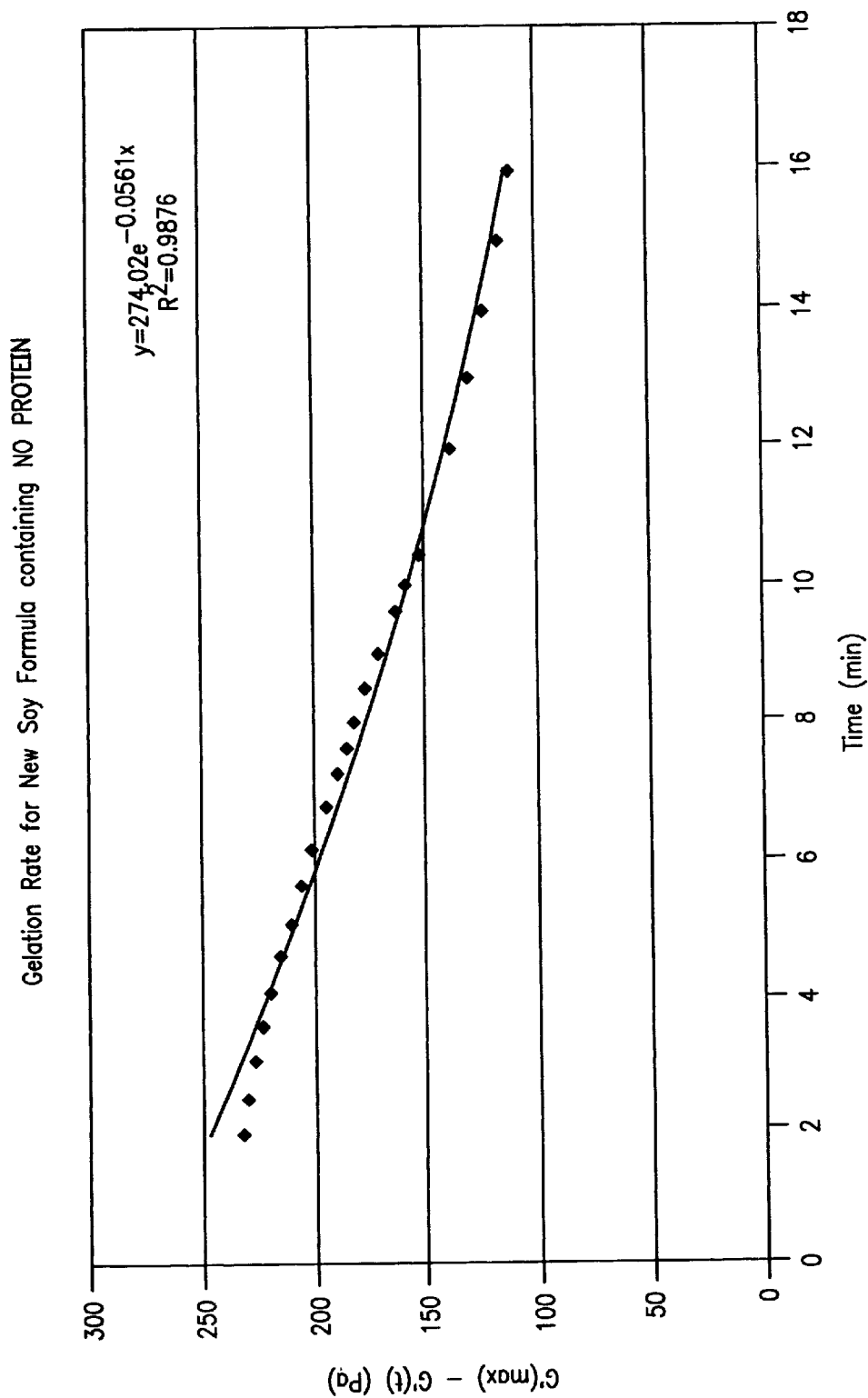
Figure 16:
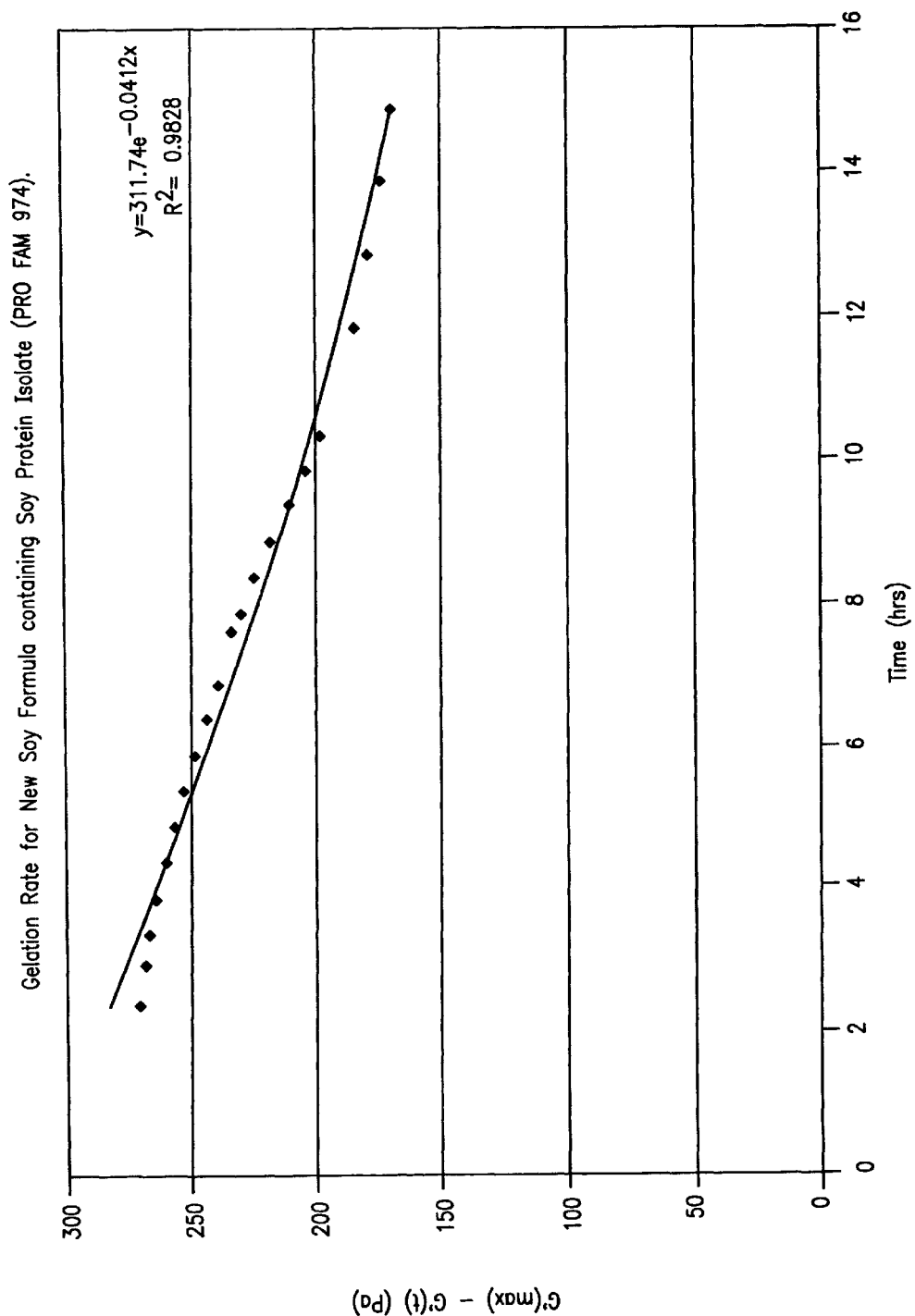
Figure 17:
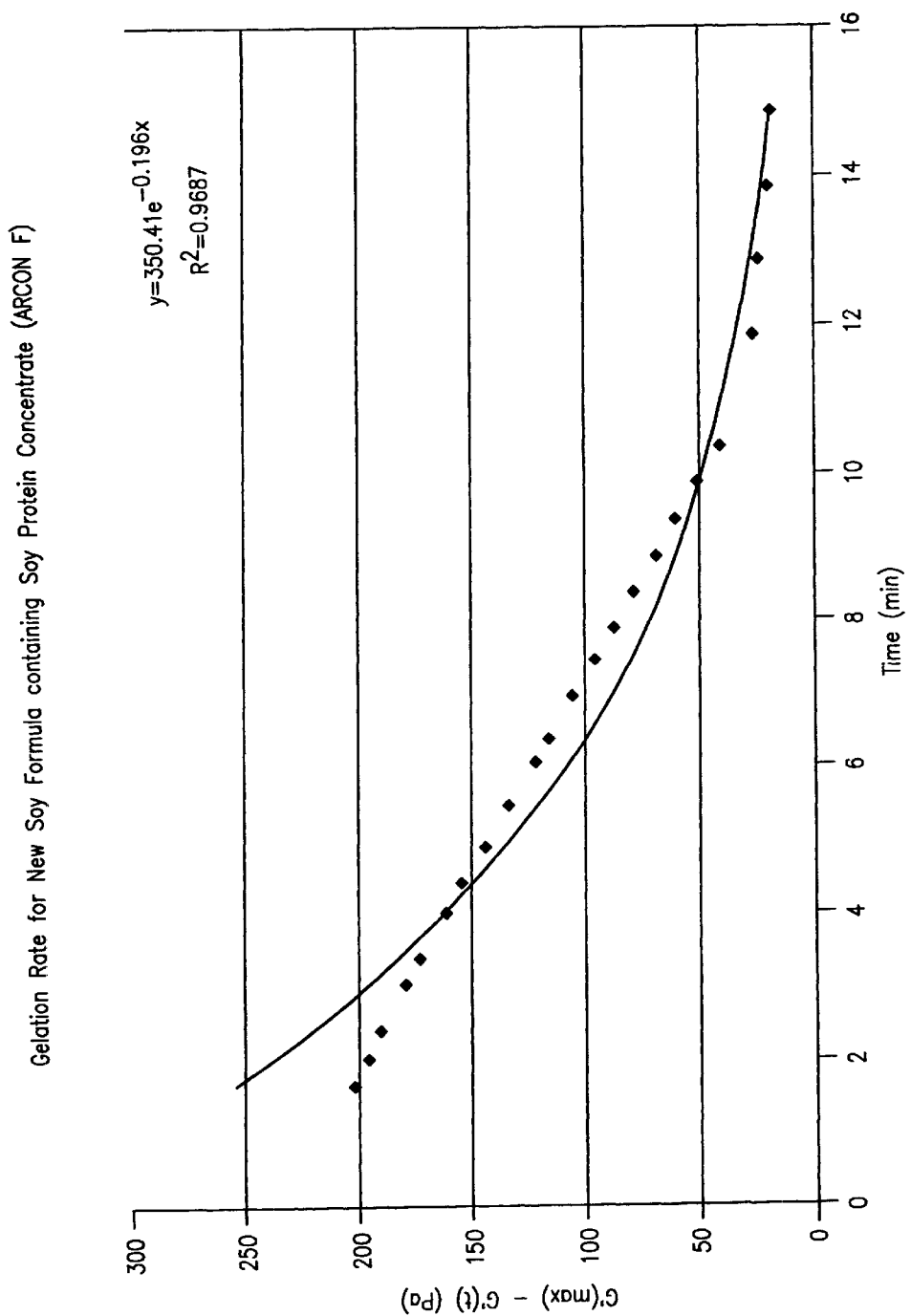
Figure 18:
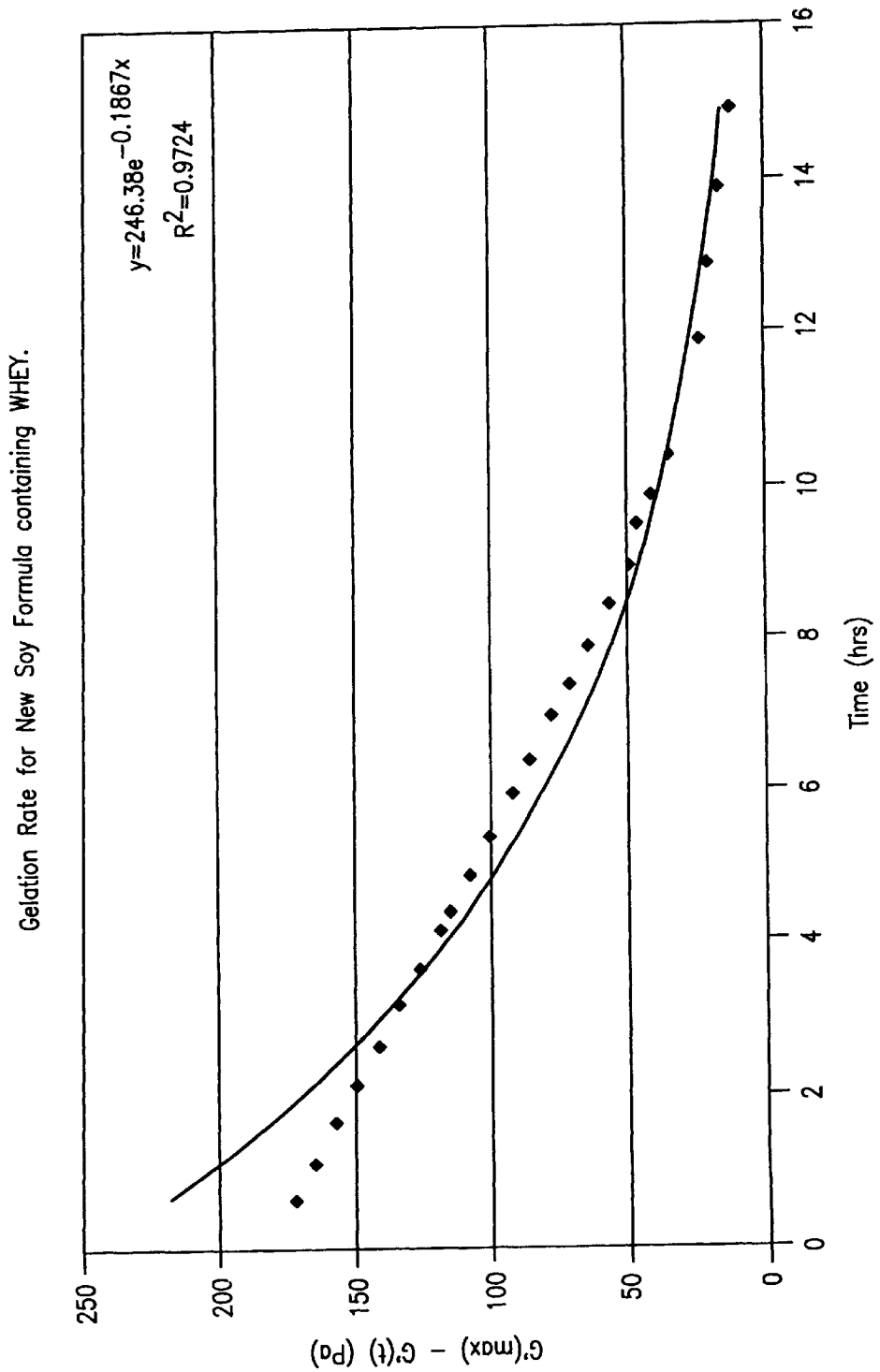
Figure 19:
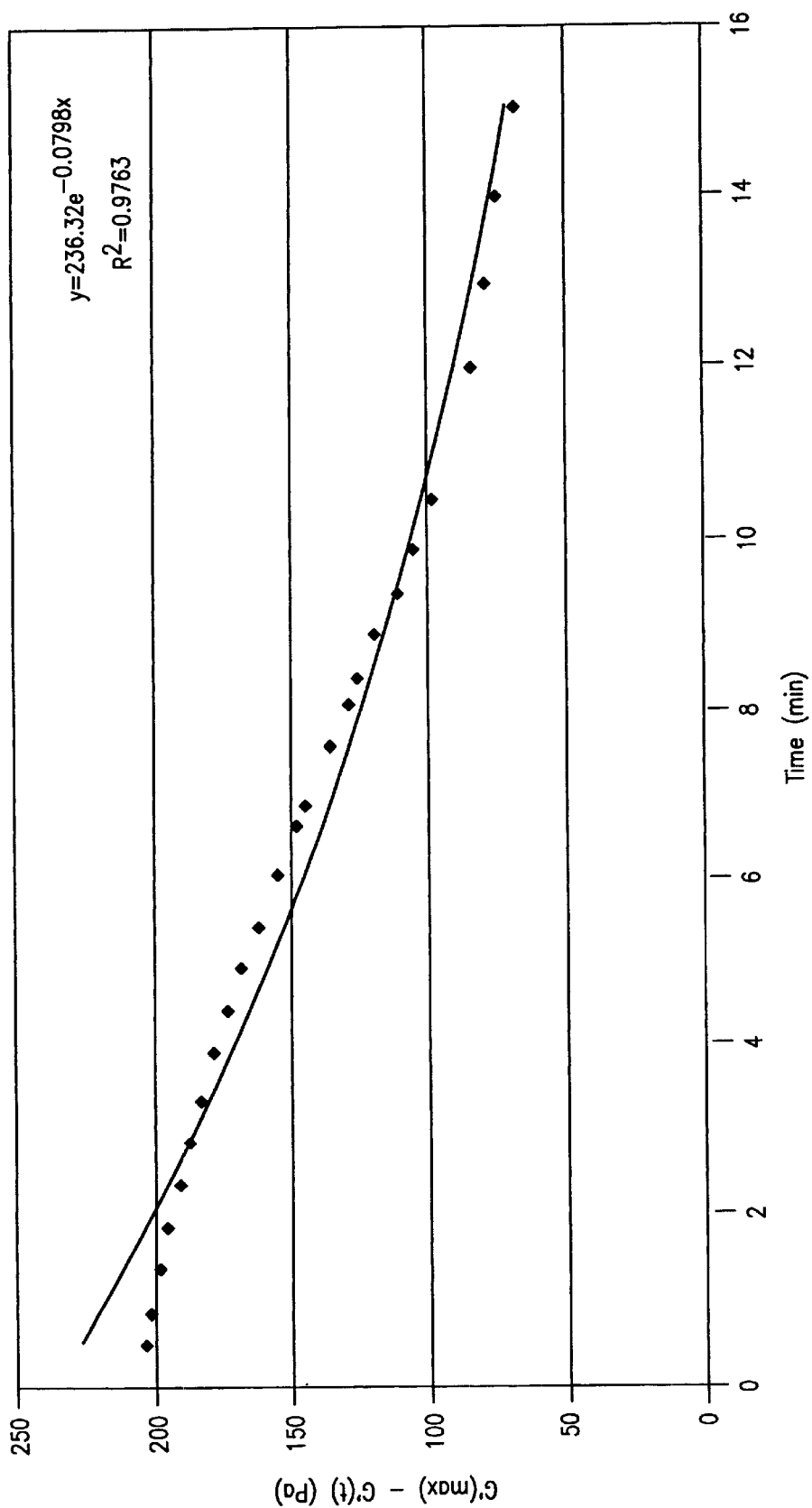
Figure 20:
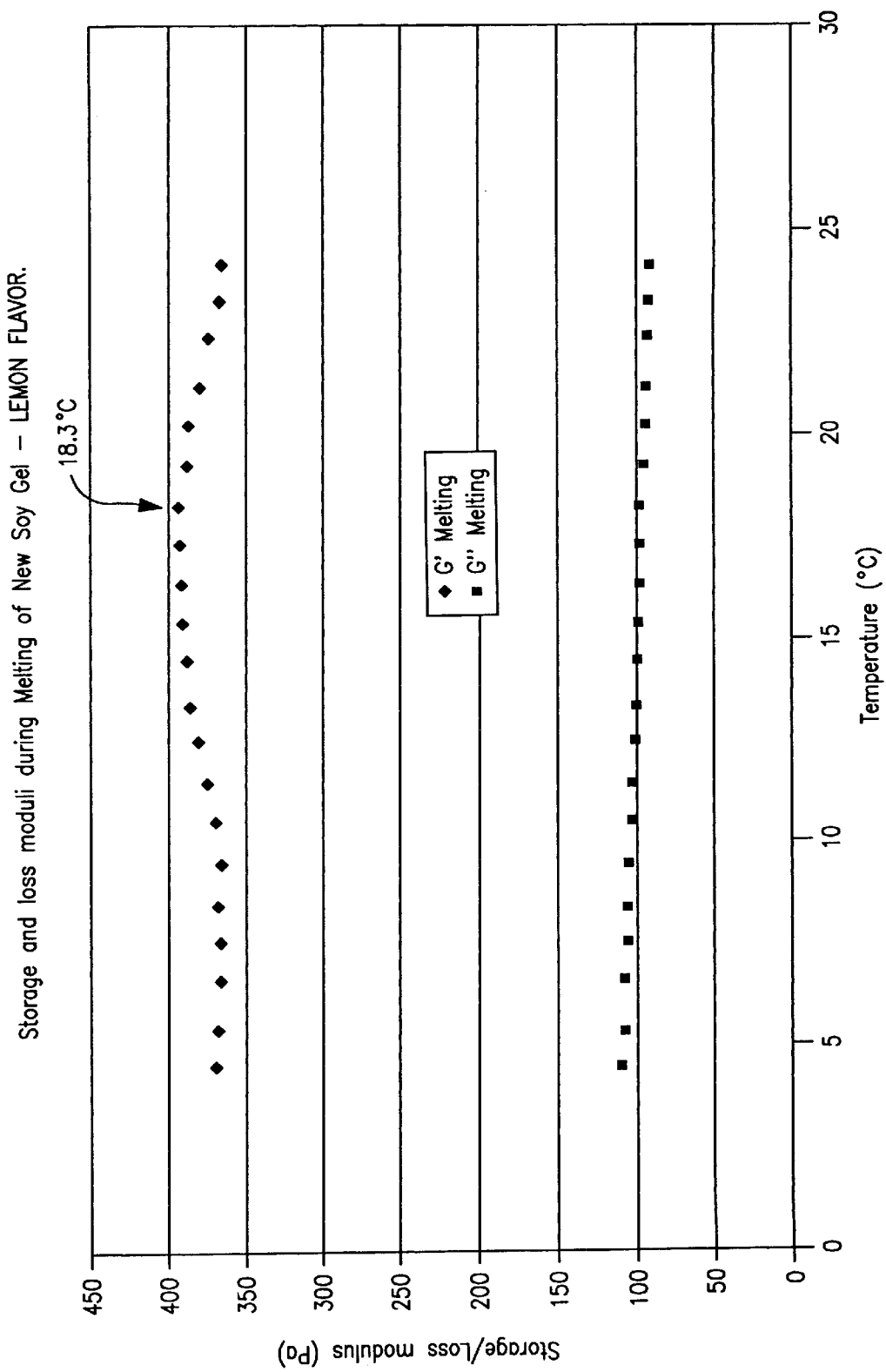
FIGS. 20–24 illustrate the melting profiles of various gelling systems.
Figure 21:
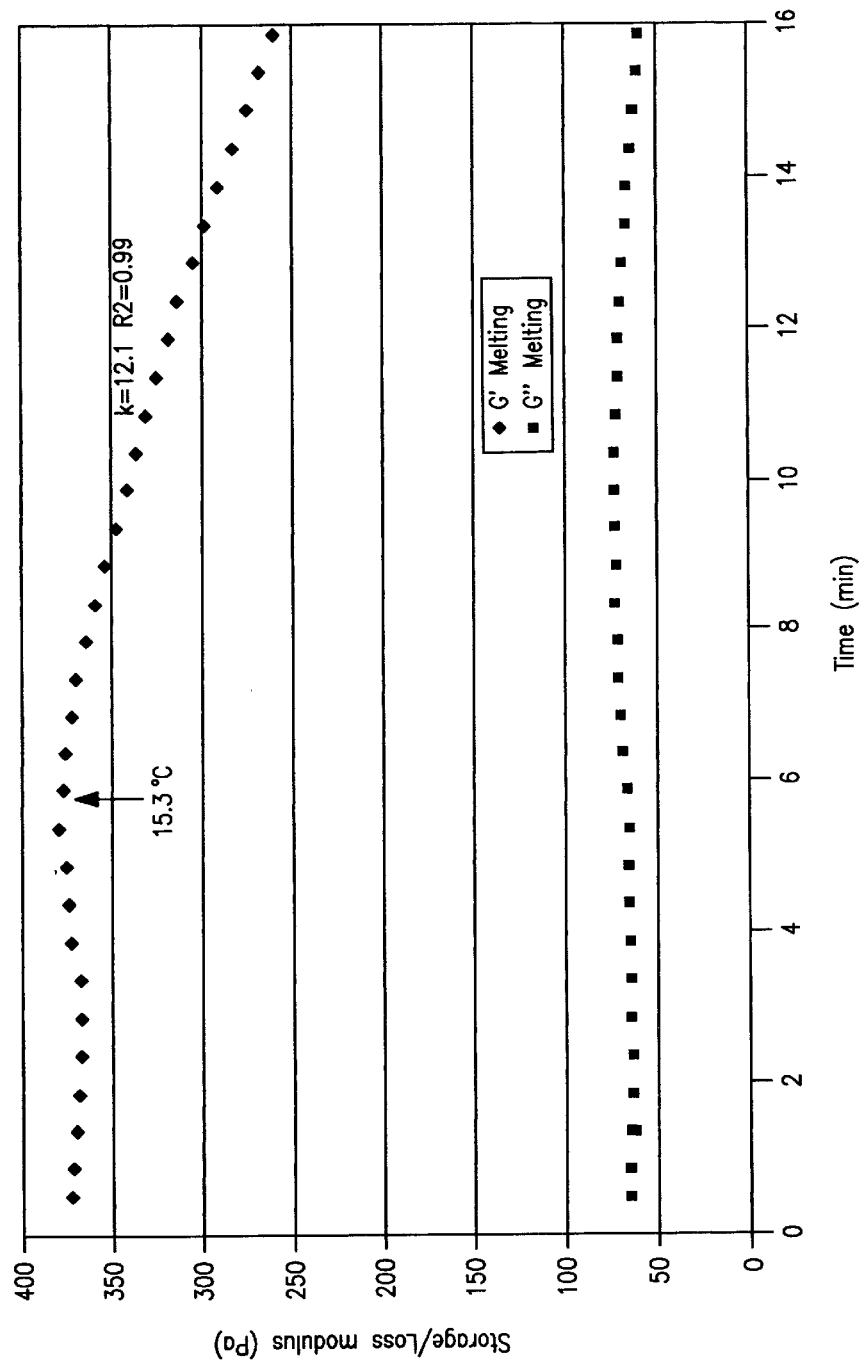
Figure 22:
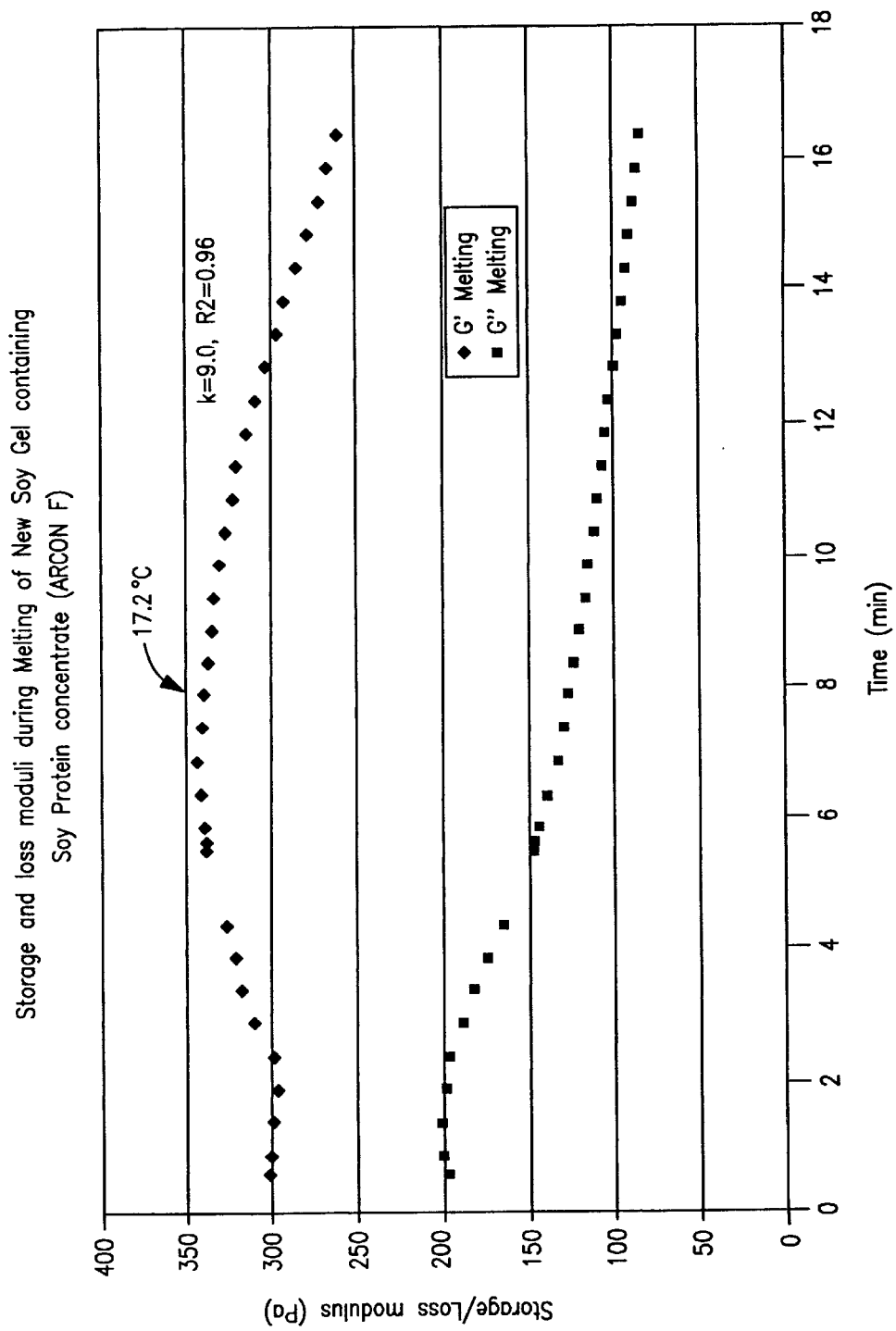
Figure 23:
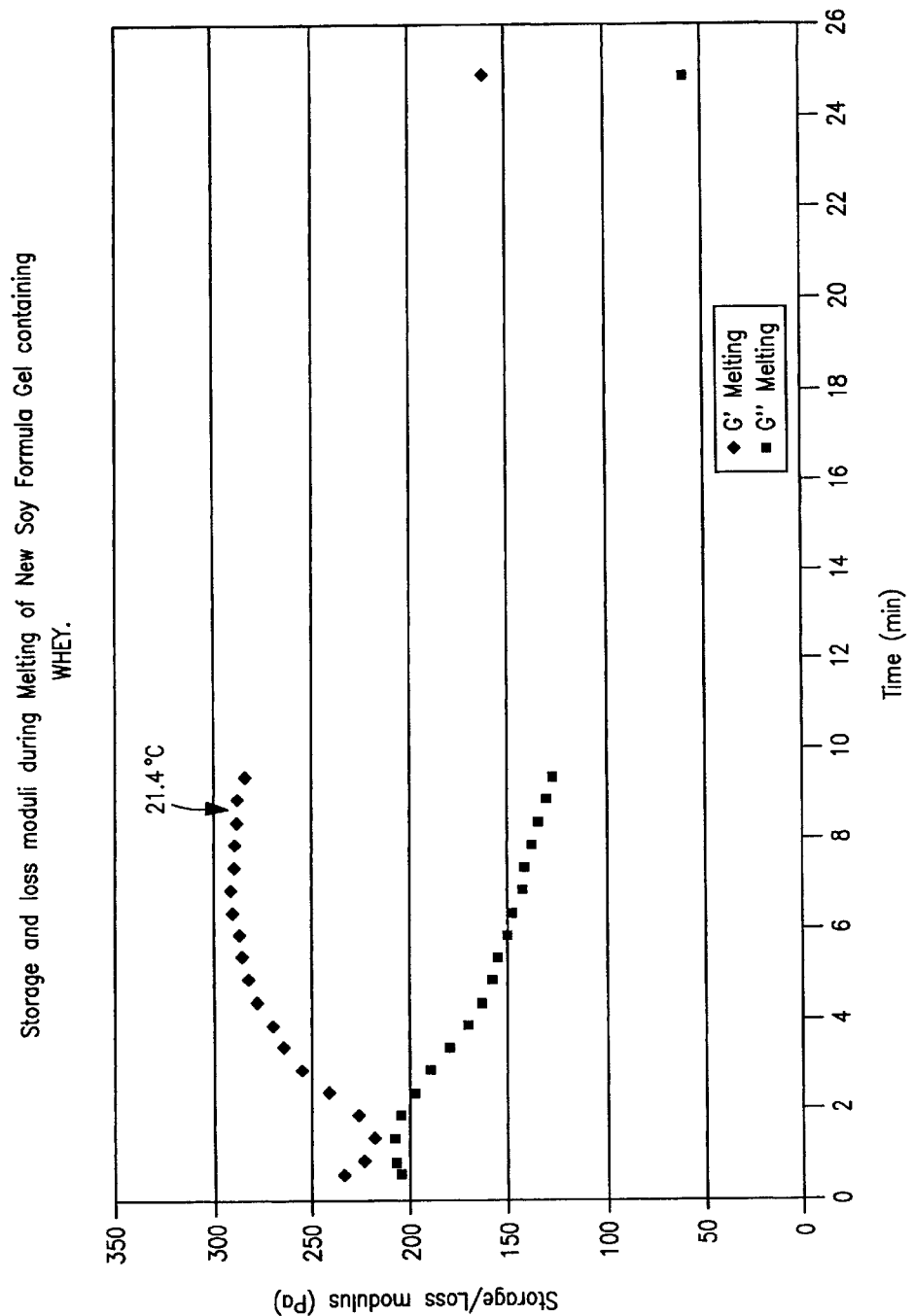
Figure 24:
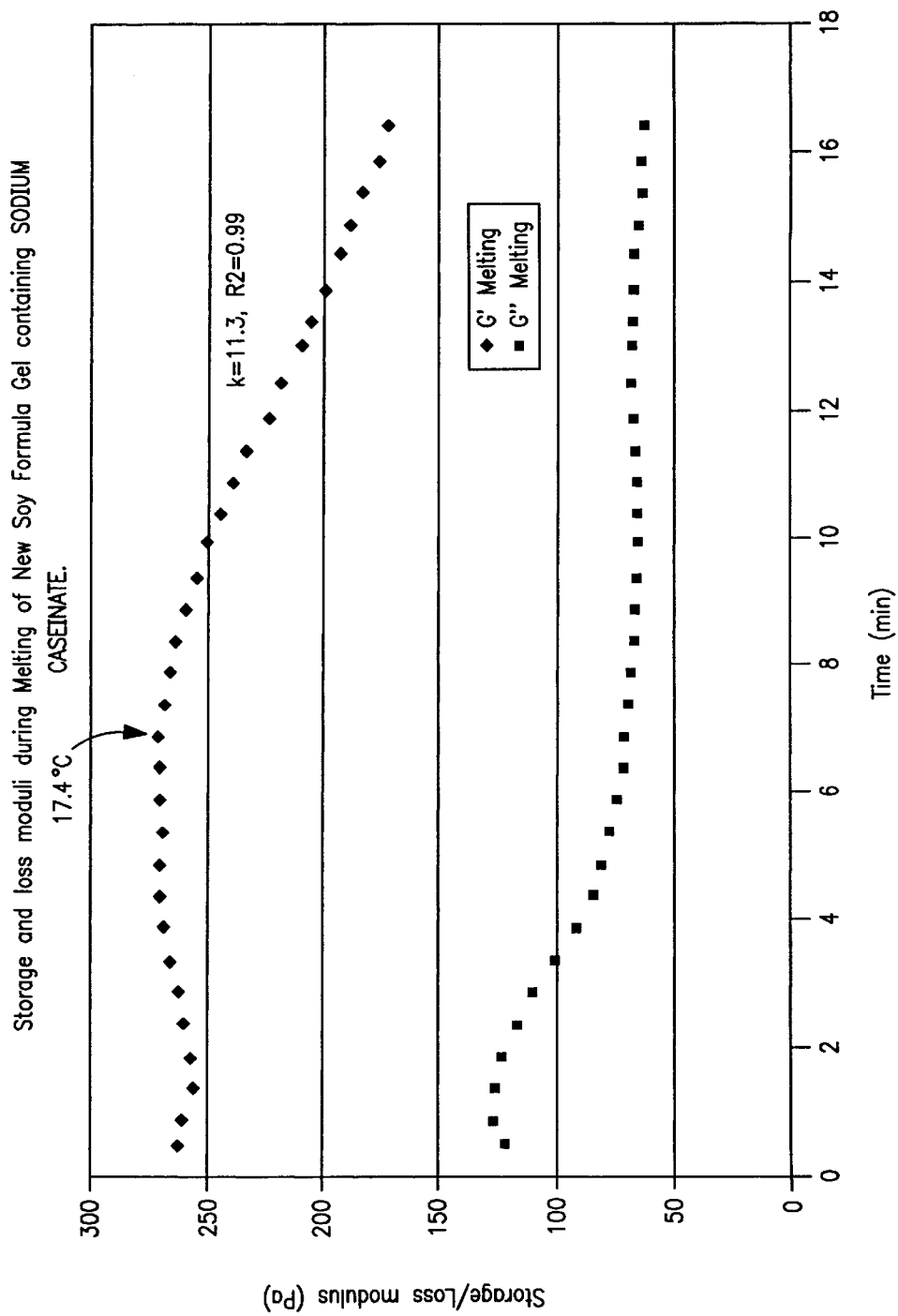

Gelling systems containing no protein and gelling systems containing soy protein isolate exhibited the best gelling profiles: high storage modulus G' and a low loss modulus G" increasing at a very slow rate (FIGS. 8–10). Even though the gels containing soy proteins concentrate, whey and sodium caseinate produced comparable storage modulus G' values (see FIGS. 11–13), they also produced much higher loss modulus G" values indicating a highly viscous nature for these gels.

The data for storage modulus G' versus time for the first 15 minutes of holding period were fitted to Equation 1. The results for the various gelling systems are displayed in FIGS. 14–19, and summarized in Table 19. The gelling system containing no protein gelled at a rate of 0.0561 Pa/min whereas the gelation rate for the lemon flavored gel was higher at 0.0871 Pa/min. Addition of soy protein isolate reduced gelation rate to 0.0412 Pa/min, while whey and soy protein concentrate increased gelatin rate significantly to 0.0869 and 0.0798 Pa/min respectively. The results are summarized in Table 19.

Determination of Gel Strength

Gel strength was estimated to be the value of the storage modulus G' at the end of 75 minutes of gelation at 4° C. Table 19 shows that the gelling system containing no protein had a gel strength of about 308 Pa. Addition of whey and sodium caseinate decreased gel strength to 243 Pa and 263 Pa, respectively, while addition of soy protein isolate increased gel strength to 371 Pa. Addition of soy protein concentrate had no significant effect on gel strength.

Determination of Melting Temperature and Melting Rate

The melting profiles for all gelling systems investigated are shown in FIGS. 20–24 and the data is summarized in Table 19. The lemon flavored gel started to melt at about 18° C. at a rate of 9.7 Pa/min. Table 19 shows that the gelling system containing soy protein isolate started to melt at about 15° C. at a rate of 12 Pa/min. Systems containing soy protein concentrate and sodium caseinate had slightly higher melting point (17.2 and 17.4° C. respectively) and lower melting rate 19.0 and 11.3 Pa/min respectively). In general, the melting temperature and melting rate for all the gelling systems were similar to those of the lemon flavored gel except for the whey containing gelling systems which had the lowest melting rate of 7.8 Pa/min.

TABLE 19

Gelatin Parameters for Various Gelling Systems

| Gelling System | G' at end of Cooling (PA) | Gelation Temperature (° C.) | Gelation Rate (Pa/min) | Gel Strength (Pa) | Melting Temperature (° C.) | Melting Rate (Pa/min) |
|---|---|---|---|---|---|---|
| Lemon | 276 | 23 | 0.0871 | 427 | 18.3 | 9.7 |
| No PROTEIN | 163 | 20.7 | 0.0561 | 308 | — | — |
| Soy Protein Isolate | 181 | 19.7 | 0.0412 | 371 | 15.3 | 12.1 |
| Soy Protein Concentrate | 287 | 22.8 | 0.196 | 304 | 17.2 | 9.0 |
| Whey | 231 | 24 | 0.1867 | 243 | 21.4 | 7.8 |
| Sodium Caseinate | 172 | 24 | 0.0798 | 264 | 17.4 | 11.3 |

Compression/Texture Testing of Soy Protein Isolate/Carrageen Gelling Systems

Compression/texture testing was performed in order to determine the effects on stress and strain due to varying amounts of protein and carbohydrates in a gel. As indicated above the cherry, lemon, and orange formulations were generally obtained by trial and error taste testing. The final consistency of the product, with 2 g protein and 3.65 carrageenan, was chosen because of its agreeable texture and syneresis characteristics. The foregoing compressing/texture tests extrapolated from this basis.

Figure 25:
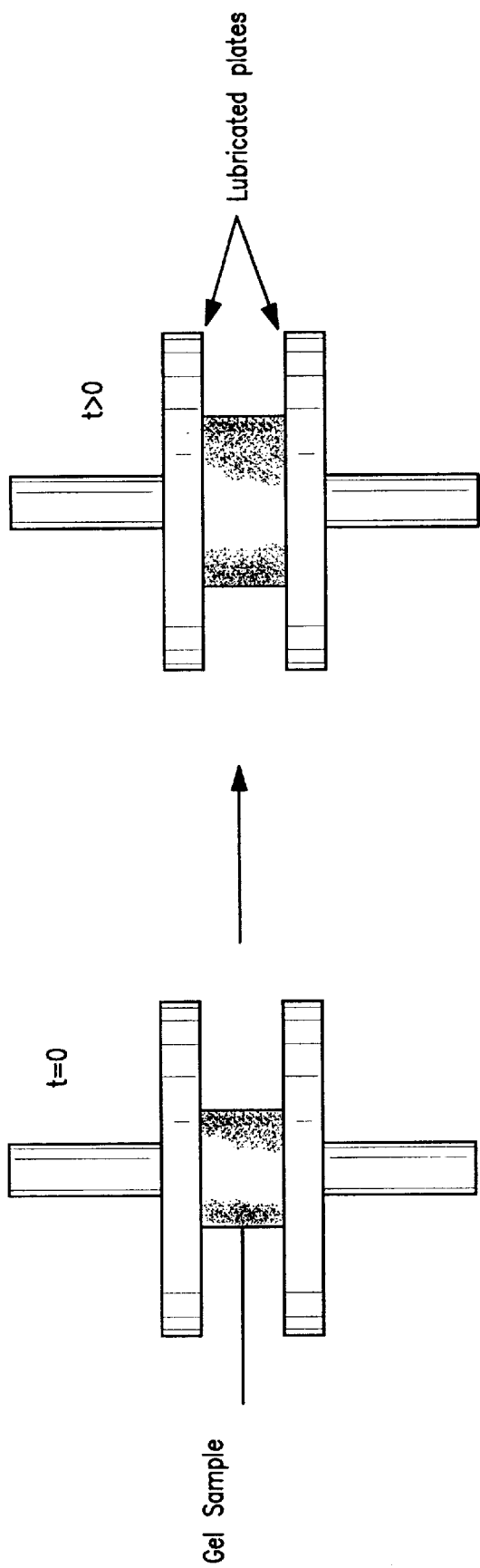
FIG. 25 illustrates a testing appartus for biaxial extensional viscometry testing of gel sample.

The compression/texture testing was accomplished via "lubricated squeezing flow" or more technically biaxial extensional viscometry. The general setup of the testing apparatus is shown in FIG. 25. Biaxial extensional viscometry is commonly used for measuring the relationship between the stress and strain for foods such as Jell-O.

Gelling systems having similar compositions to the reformulated cherry, orange, and lemon dessert gels were made with varying amounts of soy protein isolate and carrageenan. In particular, dry mixes were made from 80 g of crystalline fructose, 0.45 g calcium gluconate, and the amounts of carrageenan and soy protein isolate depicted in Tables 20–22. After the dry mixes were thoroughly mixed, 100 g of boiling water was added to 22 g of the dry mixture in a round glass beaker. The dispersion obtained was stirred (with heating if necessary) until all gelling materials were properly dissolved or dispersed. The glass beaker containing the gelling system was allowed to cool to room temperature, then placed in a refrigerator and held for two (2) hours.

After refrigeration, a bore specifically designed for cutting cylinders to be used in biaxial extensional viscometry testing was used to obtain a cylindrical sample having a 1.5 inch diameter of each gelling system to be tested. Once cut, some of the gelling systems lost there cylindrical shape when the structure of the gelling system could not support the internal mass of the cylindrical sample. In particular, when placed on a horizontal surface, the bases of these cylindrical samples expanded thus resulting in a cylindrical sample that appeared to have a larger base diameter than a top diameter. Although cylinders like this were analyzed, corrections for the difficult geometry were not taken into account. Some samples had very little of no gel structure, and therefore could not be included in the testing.

TABLE 20

Gelling Systems Representative of 3.65 g Carrageenan Plus Varied Amounts of Soy Protein Isolate.

| Sample # | protein (g) | protein percent weight | cup + initial weight | mass product used | volume water used (ml) |
|---|---|---|---|---|---|
| NS01 | 0 | 0 | 138.42 | 22 | 100 |
| NS02 | 0.5 | 0.11 | 138.91 | 22 | 100 |
| NS03 | 1 | 0.21 | 139.67 | 22 | 100 |
| NS04 | 2 | 0.42 | 140.08 | 22 | 100 |
| NS05 | 3 | 0.62 | 141.08 | 22 | 100 |
| NS06 | 4 | 0.82 | 142.05 | 22 | 100 |

TABLE 21

Gelling Systems Representative of 2.0 g Soy Protein Isolate with Varied Amounts of Carrageenan.

| Sample # | Carrageenan (g) | Carrageenan Percent by weight | cup + initial weight | mass product used | volume water used (ml) |
|---|---|---|---|---|---|
| NS07 | 0 | 0 | 136.43 | 22 | 100 |
| NS08 | 2 | 0.43 | 138.32 | 22 | 100 |
| NS09 | 3 | 0.63 | 139.39 | 22 | 100 |
| NS10 | 4 | 0.83 | 140.43 | 22 | 100 |

TABLE 22

Gelling Systems Representative of 3.0 g Soy Protein Isolate with Varied Amounts of Carrageenan.

| Sample # | Carrageenan (g) | Carrageenan Percent by weight | cup + initial weight | mass product used | volume water used (ml) |
|---|---|---|---|---|---|
| NS11 | 0 | 0 | 137.13 | 22 | 100 |
| NS12 | 2 | 0.42 | 139.32 | 22 | 100 |
| NS13 | 3 | 0.63 | 140.75 | 22 | 100 |
| NS14 | 4 | 0.82 | 142.07 | 22 | 100 |

Figure 26:
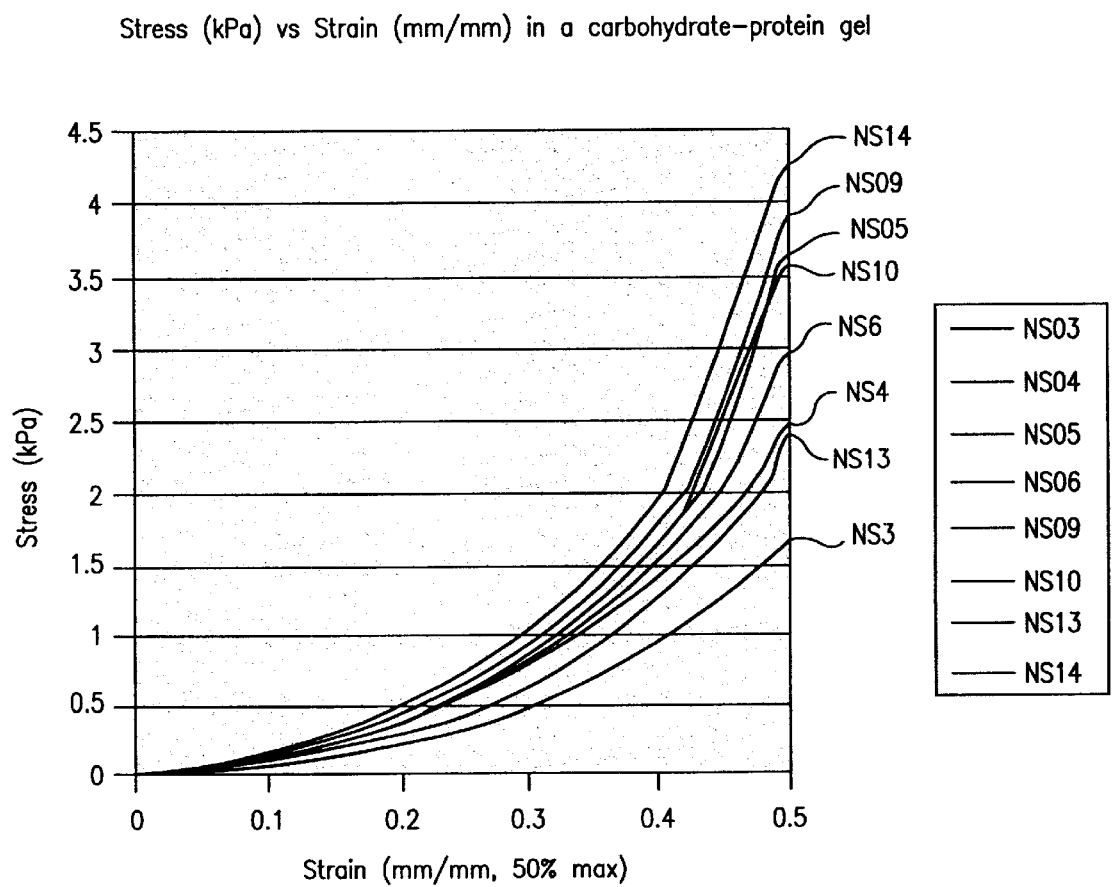
FIGS. 26–29 illustrate the 50% stress versus 50% strain results for various gelling systems.
Figure 27:
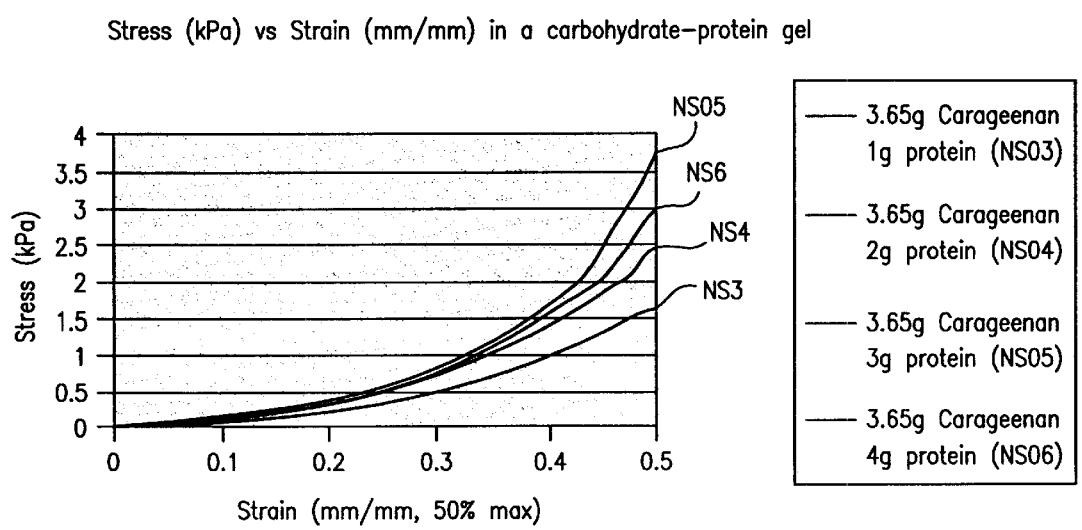
Figure 28:
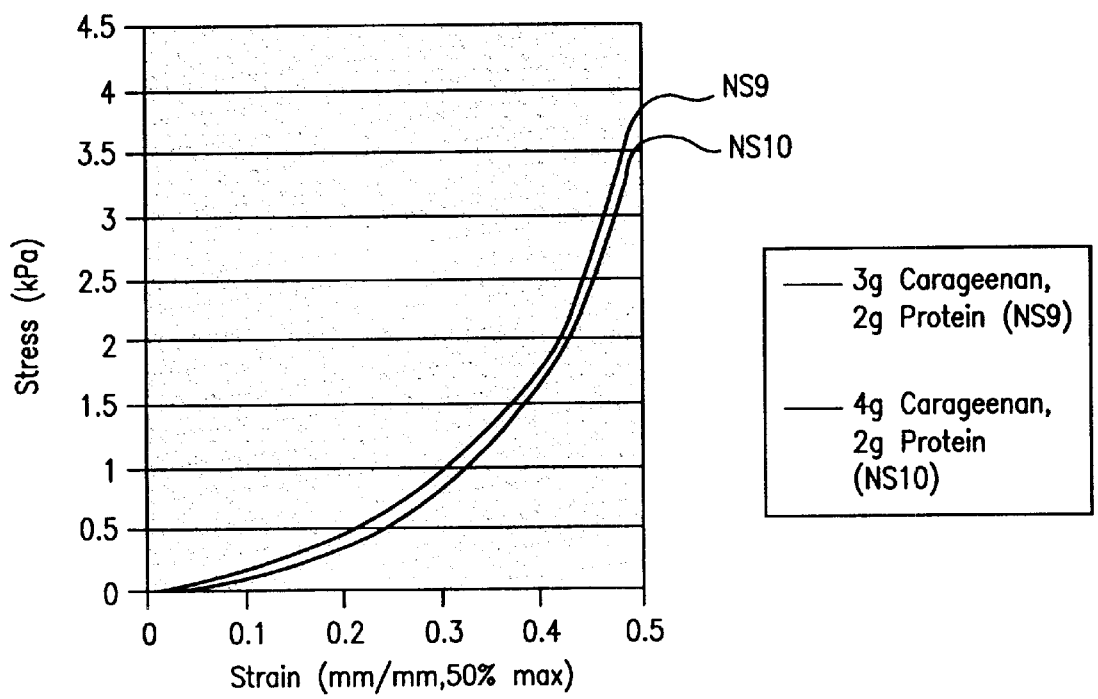
Figure 29:
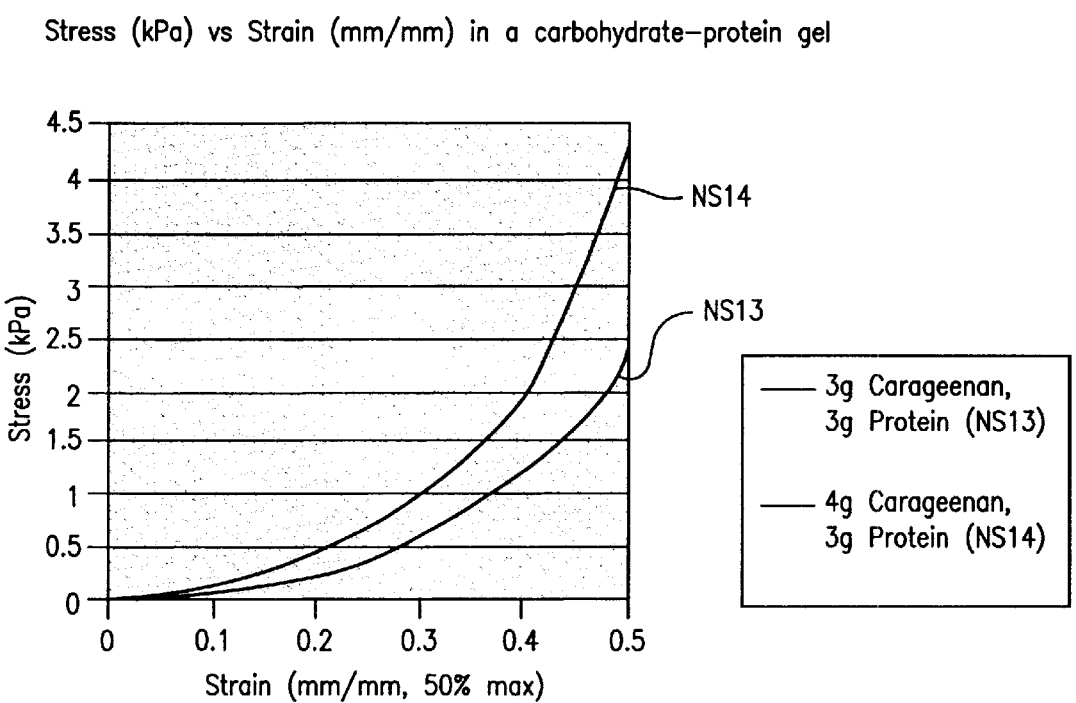

FIGS. 26–29 depict the results of the load required to compress a cylindrical sample a certain distance. More specifically, FIG. 26 depicts a composite of all the loading tests, and FIG. 27 depicts the load required to compress the cylindrical samples of the gelling systems detailed in Table 20 a certain distance. In particular, FIG. 27 depicts the affect of varying the amount of soy protein isolate from 0 g to 4 g or from about 0% to about 0.81% by weight of the resulting gelling system while maintaining the level of carrageenan at a constant amount. Similarly, FIGS. 28 and 29 depict the load required to compress the cylindrical samples of the gelling systems detailed in Tables 21 and 22, respectively, a certain distance. More specifically, FIG. 28 depicts the affect of varying the amount of carrageen from 0 g to 4 g or from about 0% to about 0.83% by weight of the resulting gelling system while maintaining the level of soy protein at a constant amount of 2 g or about 0.42% to about 0.44% by weight of the resulting gelling system, and FIG. 29 depicts the affect of varying the amount of carrageen from 0 g to 4 g or from 0% to about 0.82% by weight of the resulting gelling system while maintaining the level of soy protein at a constant amount of 3 g or about 0.61% to about 0.64% by weight of the resulting gelling system.

Referring now to FIG. 27, the graph illustrates that the sample NS03 requires the least axial pressure to compress it to half of its original height (i.e. 50% vertical strain). Sample NS03 has the lowest amount of soy protein isolate of those gelling systems upon which biaxial extensional viscometry was performed. As can be seen in FIG. 27, as the amount of soybean protein isolate increases, the force required to reach 50% stain also increases.

Referring now to FIG. 28, there appears to be no discernable trend for varying the carrageenan level with 2 g of soy protein isolate above 3 g of carrageen. The reformulated cherry, lemon, and orange dessert gels include 3.65 g of carrageenan and 2 g protein. This is roughly between the two graphed samples NS09 and NS10 of FIG. 28.

Referring now to FIG. 29, as expected, the gelling system NS14 with the higher amount of carrageenan requires a larger stress to reach 50% strain. What is interesting to note in this graph is that the difference in between the two lines is greater than in the graph depicted in FIG. 29. The difference may be due to the higher soy protein isolate content. However, the difference also may be due to a lack of lubrication between the plates, thereby introducing error. Since the graph of sample NS14 is slightly above that of NS10, it probably is good data. However, since the graphs of the samples NS13 and NS9 are so different, and the graph of the sample NS13 is not in accord with what "should" happen, the greater difference between samples NS13 and NS14 is most likely due to error introduced into the testing of the sample NS13.

As a result of the biaxial extensional viscometry tests, there appears to be room for additional soy protein isolate to the cherry, orange, and lemon dessert gels, even if the carrageenan is kept at its current level. From the stress vs. strain curves depicted in FIGS. 26–29, it can be seen that the addition of an extra gram of soy protein isolate only slightly increases the stress at 50% compression, thus increasing the soy protein isolate to roughly 0.67% by weight of the resulting dessert gel. The addition of more soy protein isolate would increase the nutritional value of the dessert gels and further aid the negative effects of syneresis due to the extra soy protein isolate binding more water in the gelling system. Therefore, an additional gram of soy protein isolate should increase the stability and quality of the dessert gels.

While the invention has been illustrated and described in detail in the drawings and foregoing description, such illustration and description is to be considered as exemplary and not restrictive in character, it being understood that only exemplary embodiments have been shown and described and that all changes and modifications that come within the spirit of the invention are desired to be protected.

What is claimed is:

1. A gelatinous dessert product, comprising a gelling agent, a water soluble protein component, and a water based liquid component which form a gelling system, wherein said gelling system comprises up to about 0.82 percent by weight of said protein component, and said protein component comprises at least 50% by weight of protein, wherein the gelling system allows the dessert product to remain a gel at a temperature up to about 24° C.

2. The gelatinous dessert product of claim 1, wherein said protein component comprises at least 69% by weight of protein.

3. The gelatinous dessert product of claim 1, wherein said protein component comprises at least 90% by weight of protein.

4. The gelatinous dessert product of claim 1, wherein said protein component comprises from about 69% by weight to about 94% by weight of protein.

5. The gelatinous dessert product of claim 4, wherein said gelling system comprises up to about 0.67% by weight of said protein component.

6. The gelatinous dessert product of claim 1, wherein said gelling system comprises about 0.38% by weight to about 0.67% by weight of said protein component.

7. The gelatinous dessert product of claim 1, wherein said protein component comprises at least 90% by weight of protein, and said gelling system comprises about 0.38% by weight to about 0.67% by weight of said protein component.

8. The gelatinous dessert product of claim 1, wherein said gelling agent consists essentially of carrageenan, and said protein component consists essentially of soy protein isolate.

9. The gelatinous dessert product of claim 1, wherein said gelling agent consists essentially of carrageenan, and said protein component comprises a soy protein selected from the group consisting of soy protein isolate and soy protein concentrate.

10. The gelatinous dessert product of claim 1, wherein said gelling agent consists essentially of carrageenan, and said protein component comprises a protein selected from the group consisting of soy protein isolate, soy protein concentrate, whey, and sodium caseinate.

11. The gelatinous dessert product of claim 1, wherein said gelling agent consists essentially of carrageenan, and said gelling system comprises at least 0.43% by weight of said gelling agent.

12. The gelatinous dessert product of claim 1, wherein said gelling agent consists essentially of carrageenan, and said gelling system comprises from about 0.43% by weight to about 1.204% by weight of said gelling agent.

13. The gelatinous dessert product of claim 1, wherein said gelling agent consists essentially of carrageenan, and said gelling system comprises from about 0.62% by weight to about 0.85% by weight of said gelling agent.

14. The gelatinous dessert product of claim 1, wherein said gelling agent consists essentially of carrageenan, and said gelling system comprises from about 0.806% to about 0.85% by weight of said gelling agent.

15. The gelatinous dessert product of claim 1, wherein after 60 minutes of holding at a temperature below a gelation temperature for said gelling system, said gelling system has a storage modulus G' of at least 300 Pa and a loss modulus G" of less than 200 Pa.

16. The gelatinous dessert product of claim 1, wherein after 60 minutes of holding at a temperature below the gelation temperature for said gelling system, said gelling system has a storage modulus G' of at least 350 Pa and a loss modulus G" of less than 100 Pa.

17. The gelatinous dessert product of claim 1, wherein said gelling system has a gelation temperature between about 19° C. and about 24° C., and has a melting temperature between about 15° C. and about 18° C.

18. The gelatinous dessert product of claim 1, further comprising a nutritional additive selected from vitamins and minerals.

19. The gelatinous dessert product of claim 1, further comprising a nutritional additive selected from isoflavones, calcium, and ascorbic acid.

20. A gelatinous dessert product, comprising a gelling agent, a water soluble protein component, and a water based liquid component which form a gelling system, wherein said gelling system comprises about 0.43% percent to about 1.204% by weight of said gelling agent, wherein the gelling system allows the dessert product to remain a gel at a temperature up to about 24° C.

21. The gelatinous dessert product of claim 20, wherein the gelling system comprises about 0.62% to about 1.204% by weight of said gelling agent.

22. The gelatinous dessert product of claim 21, wherein the gelling system comprises about 0.62% to about 0.85% by weight of said gelling agent.

23. The gelatinous dessert product of claim 22, wherein the gelling system comprises about 0.806% to about 0.85% by weight of said gelling agent.

24. The gelatinous dessert product of claim 23, wherein the protein component comprises a soy protein selected from the group consisting of soy protein isolate and soy protein concentrate.

25. The gelatinous dessert product of claim 20, wherein the protein component comprises a soy protein selected from the group consisting of soy protein isolate and soy protein concentrate.

26. The gelatinous dessert product of claim 21, wherein the protein component comprises a soy protein selected from the group consisting of soy protein isolate and soy protein concentrate.

27. The gelatinous dessert product of claim 20, wherein the gelling system comprises up to 0.82% by weight of said protein component, and said protein component comprises at least 50% by weight of protein.

28. The gelatinous dessert product of claim 27, wherein said protein component comprises at least 69% by weight of protein.

29. The gelatinous dessert product of claim 28, wherein said protein component comprises at least 90% by weight of protein.

30. The gelatinous dessert product of claim 29, wherein said protein component comprises from about 69% by weight to about 94% by weight of protein.

31. The gelatinous dessert product of claim 20, wherein said gelling system comprises up to about 0.82% by weight of said protein component.

32. The gelatinous dessert product of claim 31, wherein said gelling system comprises at least about 0.38% by weight of said protein component.

33. The gelatinous dessert product of claim 32, wherein said gelling system comprises about 0.38% by weight to about 0.67% by weight of said protein component.

34. The gelatinous dessert product of claim 33, wherein the protein component comprises at least 50% by weight of protein and wherein the protein component comprises a soy protein selected from the group consisting of soy protein isolate and soy protein concentrate.

35. The gelatinous dessert product of claim 34, wherein said protein component comprises at least 90% by weight of protein.

* * * * *